US010414900B2

(12) United States Patent
Arechederra

(10) Patent No.: US 10,414,900 B2
(45) Date of Patent: Sep. 17, 2019

(54) PRE-EXFOLIATED LAYERED MATERIAL

(71) Applicants: PolyAd Services, LLC, Earth City, MO (US); Robert Arechederra, Ballwin, MO (US)

(72) Inventor: Robert Arechederra, Ballwin, MO (US)

(73) Assignee: BYK USA INC., Wallingford, CT (US)

( * ) Notice: Subject to any disclaimer, the term of this patent is extended or adjusted under 35 U.S.C. 154(b) by 0 days.

(21) Appl. No.: 15/104,711

(22) PCT Filed: Dec. 11, 2014

(86) PCT No.: PCT/US2014/069681
§ 371 (c)(1),
(2) Date: Jun. 15, 2016

(87) PCT Pub. No.: WO2015/094888
PCT Pub. Date: Jun. 25, 2015

(65) Prior Publication Data
US 2016/0319100 A1     Nov. 3, 2016

Related U.S. Application Data

(60) Provisional application No. 61/916,950, filed on Dec. 17, 2013.

(51) Int. Cl.
| | | |
|---|---|---|
| C08K 5/12 | (2006.01) | |
| C09K 15/22 | (2006.01) | |
| C09C 1/42 | (2006.01) | |
| C09C 1/40 | (2006.01) | |
| C08J 3/22 | (2006.01) | |
| C08K 5/00 | (2006.01) | |
| C08K 9/04 | (2006.01) | |
| C09K 15/08 | (2006.01) | |
| C09K 15/24 | (2006.01) | |
| C09K 15/32 | (2006.01) | |
| C09K 21/12 | (2006.01) | |

(52) U.S. Cl.
CPC ........... *C08K 5/12* (2013.01); *C08J 3/223* (2013.01); *C08K 5/0008* (2013.01); *C08K 9/04* (2013.01); *C09C 1/40* (2013.01); *C09C 1/42* (2013.01); *C09K 15/08* (2013.01); *C09K 15/22* (2013.01); *C09K 15/24* (2013.01); *C09K 15/322* (2013.01); *C09K 21/12* (2013.01); *C01P 2002/22* (2013.01); *C01P 2002/72* (2013.01); *C01P 2006/60* (2013.01); *C08J 2323/00* (2013.01)

(58) Field of Classification Search
CPC ....... C09K 15/00–34; C09C 1/40; C09C 1/42; C09C 1/46
See application file for complete search history.

(56) References Cited

U.S. PATENT DOCUMENTS

| | | | |
|---|---|---|---|
| 5,827,906 A | 10/1998 | Metzemacher | |
| 6,139,962 A | 10/2000 | Herget et al. | |
| 6,486,254 B1 | 11/2002 | Barbee et al. | |
| 7,084,197 B2 | 8/2006 | Chin et al. | |
| 7,528,191 B2 | 5/2009 | Metzemacher | |
| 2003/0021989 A1 | 1/2003 | Zhou et al. | |
| 2003/0183809 A1* | 10/2003 | Onikata | C01B 33/44 252/397 |
| 2005/0014905 A1 | 1/2005 | Chung et al. | |
| 2005/0065248 A1 | 3/2005 | Choi et al. | |
| 2006/0100339 A1 | 5/2006 | Gong et al. | |
| 2006/0155018 A1 | 7/2006 | Metzemacher et al. | |
| 2007/0072980 A1 | 3/2007 | Rainier et al. | |
| 2007/0142534 A1 | 6/2007 | Moad et al. | |
| 2011/0142899 A1* | 6/2011 | Lagaron Abello | B82Y 30/00 424/405 |
| 2013/0005871 A1* | 1/2013 | Puhala | C08K 9/04 524/71 |
| 2013/0165558 A1 | 6/2013 | Pfaendner et al. | |

FOREIGN PATENT DOCUMENTS

| | | |
|---|---|---|
| EP | 1581588 B1 | 2/2007 |
| EP | 1575873 B1 | 3/2011 |
| EP | 14 87 2256 | 6/2017 |
| JP | 2007-254613 | 4/2007 |
| JP | 2008-201825 | 4/2008 |
| JP | 2008-247704 | 10/2008 |
| JP | 384885 | 9/2018 |
| TW | 201609907 | 3/2016 |
| TW | 103143108 | 8/2018 |
| WO | 2004/039916 A1 | 5/2004 |
| WO | 2008152417 | 12/2008 |
| WO | 2015094888 A1 | 6/2015 |

* cited by examiner

*Primary Examiner* — WenWen Cai
(74) *Attorney, Agent, or Firm* — Taft Stettinius & Hollister LLP; Stephen F. Rost

(57) ABSTRACT

Pre-exfoliated natural or synthetic, modified or unmodified layered materials are prepared by mixing layered materials with one or more plastics additives selected from the group consisting of ultraviolet light absorbers, hindered amine light stabilizers, antioxidants, colorants, flame retardants, antimicrobials and fatty acid additives and melt extruding the mixture. The layered materials are for example modified or unmodified layered silicate clays. The galleries of the layered materials in the mixtures are expanded to a level of less than full exfoliation. The melt extruded mixtures of layered materials and additives are highly useful to prepare polymer nanocomposites.

6 Claims, 10 Drawing Sheets

PRE-EXFOLIATED LAYERED MATERIAL

CROSS-REFERENCE TO RELATED APPLICATIONS

This application is a National Stage Application of PCT/IB2014/069681 filed on Dec. 11, 2014, entitled "PRE-EXFOLIATED LAYERED MATERIALS", which designates the United States of America and which claims priority to, and the benefit of, U.S. Provisional Application 61/916,950 filed Dec. 17, 2013, entitled "PRE-EXFOLIATED LAYERED MATERIALS", all of which are incorporated herein by reference in their entirety.

BACKGROUND

The present disclosure is aimed at natural or synthetic, modified or unmodified layered materials pre-exfoliated with plastics additives. The plastic additives are for instance selected from the group consisting of ultraviolet light absorbers, hindered amine light stabilizers, antioxidants, colorants, flame retardants, antimicrobials and fatty acid additives.

Properly exfoliated layered materials, e.g. clays, dispersed in a polymer substrate, can form a polymer nanocomposite with improved properties such as barrier, tensile strength, modulus, glass transition and/or flame retardancy. Current technology to prepare a polymer/clay nanocomposite is to employ specialized high shear processing equipment or in-situ polymerization techniques. These processes are not economically feasible for all applications.

Disclosed is a method for blending and extruding conventional plastics additives with layered materials to pre-exfoliate the layered materials. The pre-exfoliated layered material/additive mixture may be incorporated into a polymer substrate via common techniques and equipment to achieve a polymer nanocomposite with fully exfoliated layered materials.

Accordingly, disclosed is a method for preparing a natural or synthetic, modified or unmodified pre-exfoliated layered material, the method comprising mixing a natural or synthetic, modified or unmodified layered material with one or more plastics additives selected from the group consisting of ultraviolet light absorbers, hindered amine light stabilizers, antioxidants, colorants, flame retardants, antimicrobials and fatty acid additives and extruding the mixture.

Also disclosed is a mixture comprising a pre-exfoliated natural or synthetic, modified or unmodified layered material and one or more plastics additives selected from the group consisting of ultraviolet light absorbers, hindered amine light stabilizers, antioxidants, colorants, flame retardants, antimicrobials and fatty acid additives.

Also disclosed is a method for preparing a polymer nanocomposite, the method comprising combining the mixture comprising a pre-exfoliated layered material and one or more plastics additives with a polymer substrate and melt blending the combination.

BRIEF DESCRIPTION OF THE DRAWINGS

FIG. 1 depicts results obtained from one experiment with CLOISITE 20A and increasing concentrations of IRGAFOS 168. The dashed line (----, 75% CLOISITE 20A 25% Phosphite 1) represents data obtained from a 75% CLOISITE:25% IRGAFOS 168 mixture. The dotted line (. . . , 60% CLOISITE 20A 35% PHOSPHITE 1) represents data obtained from a 60% CLOISITE:35% IRGAFOS 168 mixture. The star line (--✶--, 45% CLOISITE 20A 55% PHOSPHITE 1) represents data obtained from a 45% CLOISITE 20A:55% IRGAFOS 168 mixture. The circle line (--⊖--, 35% CLOISITE 65% PHOSPHITE 1) represents data obtained from a 35% CLOISITE 20A:65% IRGAFOS 168 mixture. FIG. 1 shows the decrease of intensity and shift of the d001 peak to larger gallery spacings with higher concentrations of IRGAFOS 168, indicating pre-exfoliation.

FIG. 2 depicts results obtained from an experiment with CLOISITE 20A and a fire retardant. The dashed line (-------, 35% CLOISITE 20A 65% FR) represents data obtained from a 35% CLOISITE 20A 65% FR370 mixture. The decrease in intensity of the d001 peak indicates pre-exfoliation.

FIG. 3 depicts results obtained from an experiment with CLOISITE 20A and an antioxidant. The dashed line (-------, 65% CLOISITE 20A 35% phosphite 2) represents data obtained from a 65% CLOISITE 20A 35% IRGAFOS 126 organic phosphite antioxidant mixture. The decrease in intensity of the d001 peak indicates pre-exfoliation.

FIG. 4 depicts results obtained from an experiment with CLOISITE 20A and an ultraviolet light absorber. The dashed line (-------, 60% CLOISITE 20A 40% UVA) represents data obtained from a 60% CLOISITE 20A 40% TINUVIN 328 ultraviolet light absorber mixture. The decrease in intensity of the d001 peak indicates pre-exfoliation.

FIG. 5 depicts results obtained from an experiment with CLOISITE 20A and an antioxidant. The dashed line (-------, 60% CLOISITE 20A 40% Phenolic AO) represents data obtained from a 60% CLOISITE 20A 40% IRGANOX 1010 hindered phenolic antioxidant mixture. The decrease in intensity of the d001 peak indicates pre-exfoliation.

FIG. 6 depicts results obtained from an experiment with CLOISITE 20A and an alkaline earth metal salt of a higher fatty acid. The dashed line (-------, 60% CLOISITE 20A 40% calcium stearate) represents data obtained from a 60% CLOISITE 20A 40% calcium stearate mixture. The decrease in intensity of the d001 peak indicates pre-exfoliation.

FIG. 7 depicts results obtained from an experiment with CLOISITE 20A and a hindered amine light stabilizer. The dashed line (-------, 60% CLOISITE 20A 40% HALS 1) represents data obtained from a 60% CLOISITE 20A 40% 1-(2-hydroxy-2-methylpropoxy)-4-octadecanoyl-oxy-2,2,6,6-tetramethylpiperidine hindered amine light stabilizer mixture. The decrease in intensity of the d001 peak indicates pre-exfoliation.

FIG. 8 depicts results obtained from an experiment with CLOISITE 20A and a fatty acid ester. The dashed line (-------, 60% CLOISITE 20A 40% stearate) represents data obtained from a 60% CLOISITE 20A 40% pentaerythrityl tetrastearate mixture. The decrease in intensity of the d001 peak indicates pre-exfoliation.

FIG. 9 depicts results obtained from an experiment with CLOISITE 20A and a hindered amine light stabilizer. The dashed line (-------, 60% CLOISITE 20A 40% HALS 2) represents data obtained from a 60% CLOISITE 20A 40% TINUVIN 770 hindered amine light. The decrease in intensity of the d001 peak indicates pre-exfoliation.

FIG. 10 illustrates that the nanocomposite effect in the sample that is pre-exfoliated results in a higher tensile strength than the sample that is not pre-exfoliated.

DETAILED DISCLOSURE

Figure 1:
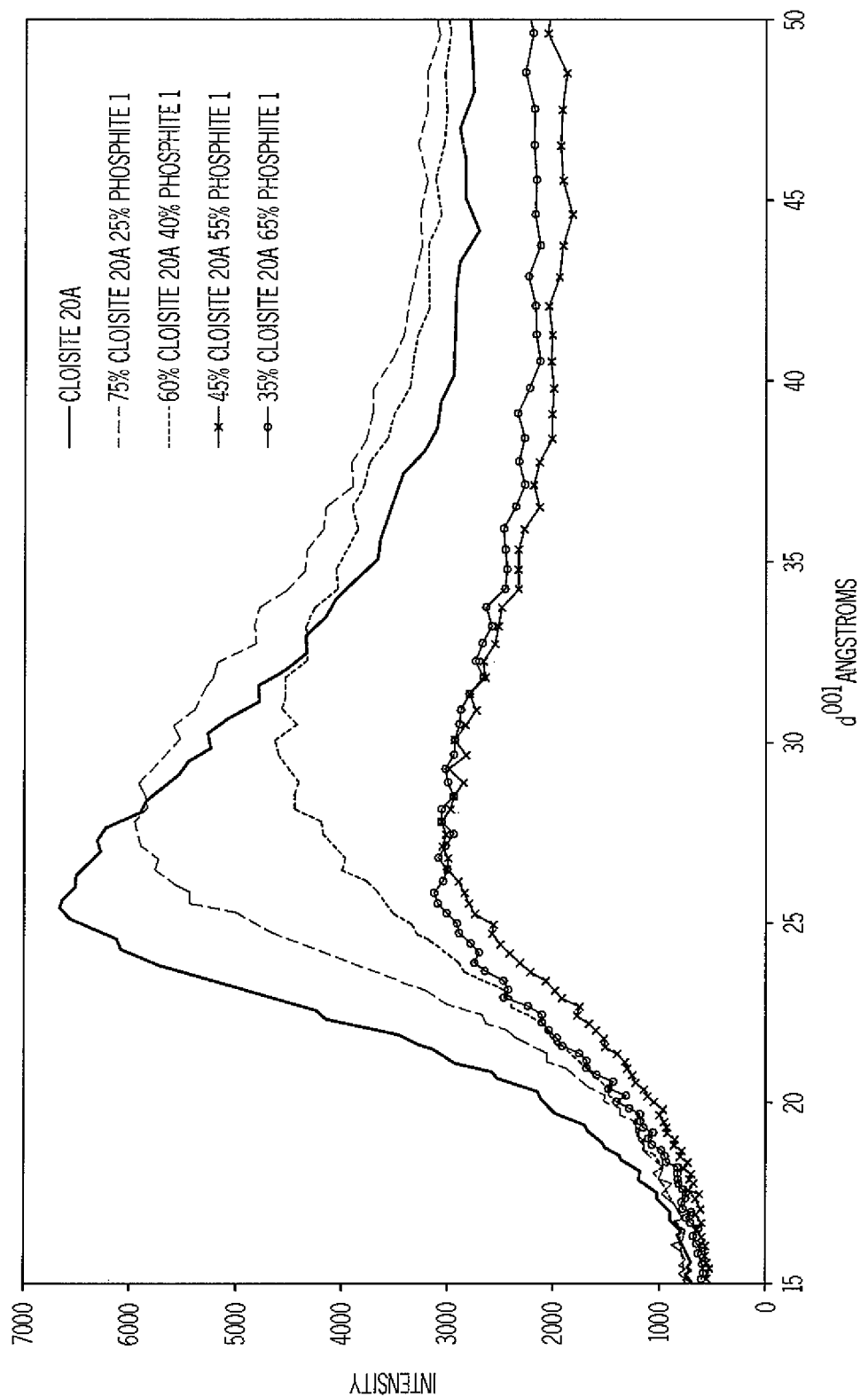
FIGS. 1-9 are X-ray diffraction patterns of the powders obtained in Example 1. The figures show the intensity of the $d^{001}$ Angstroms peak for the indicated powder. Data from a CLOISITE 20A control are shown with a solid line in FIGS. 1-9.
Figure 2:
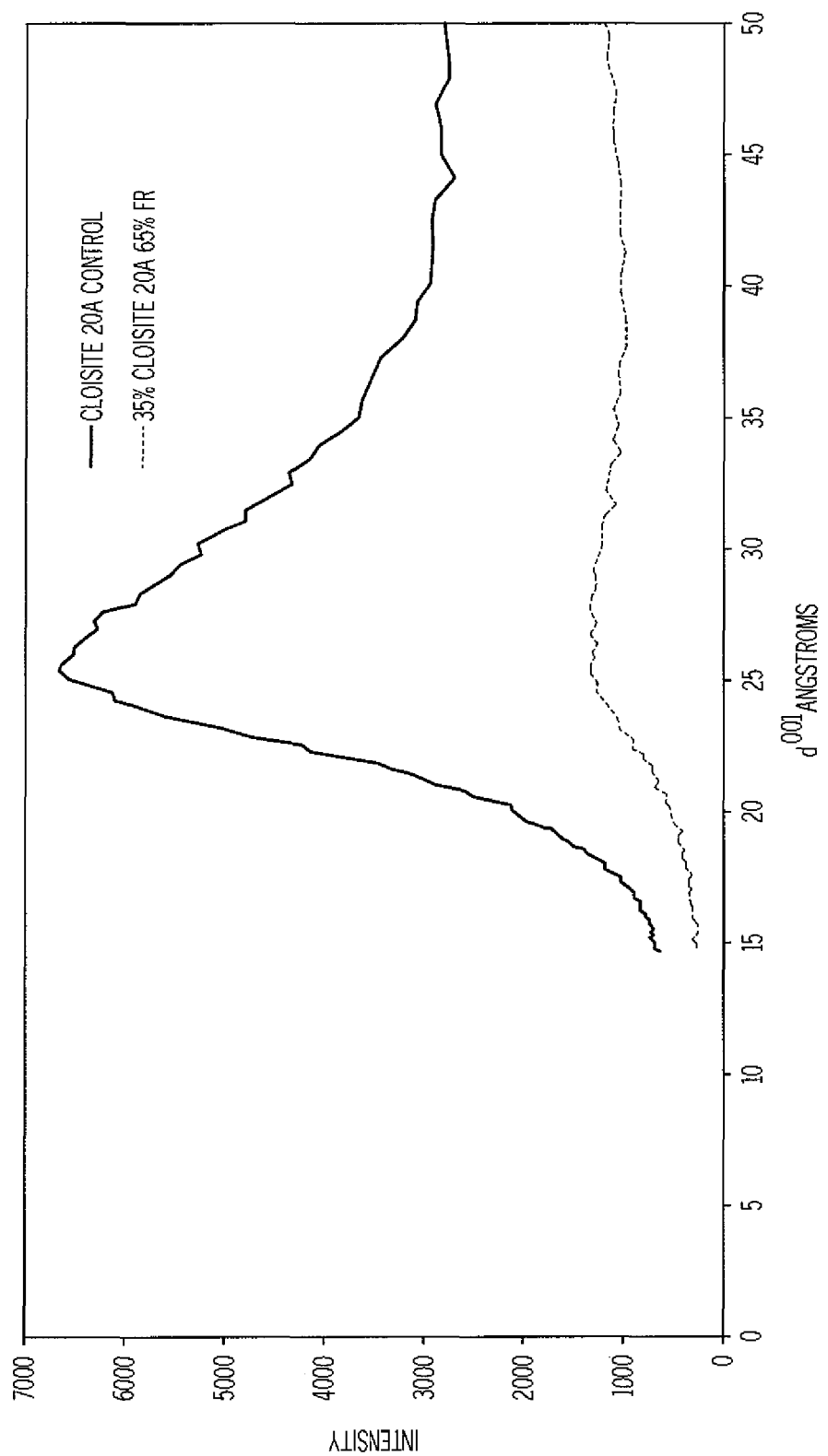
Figure 3:
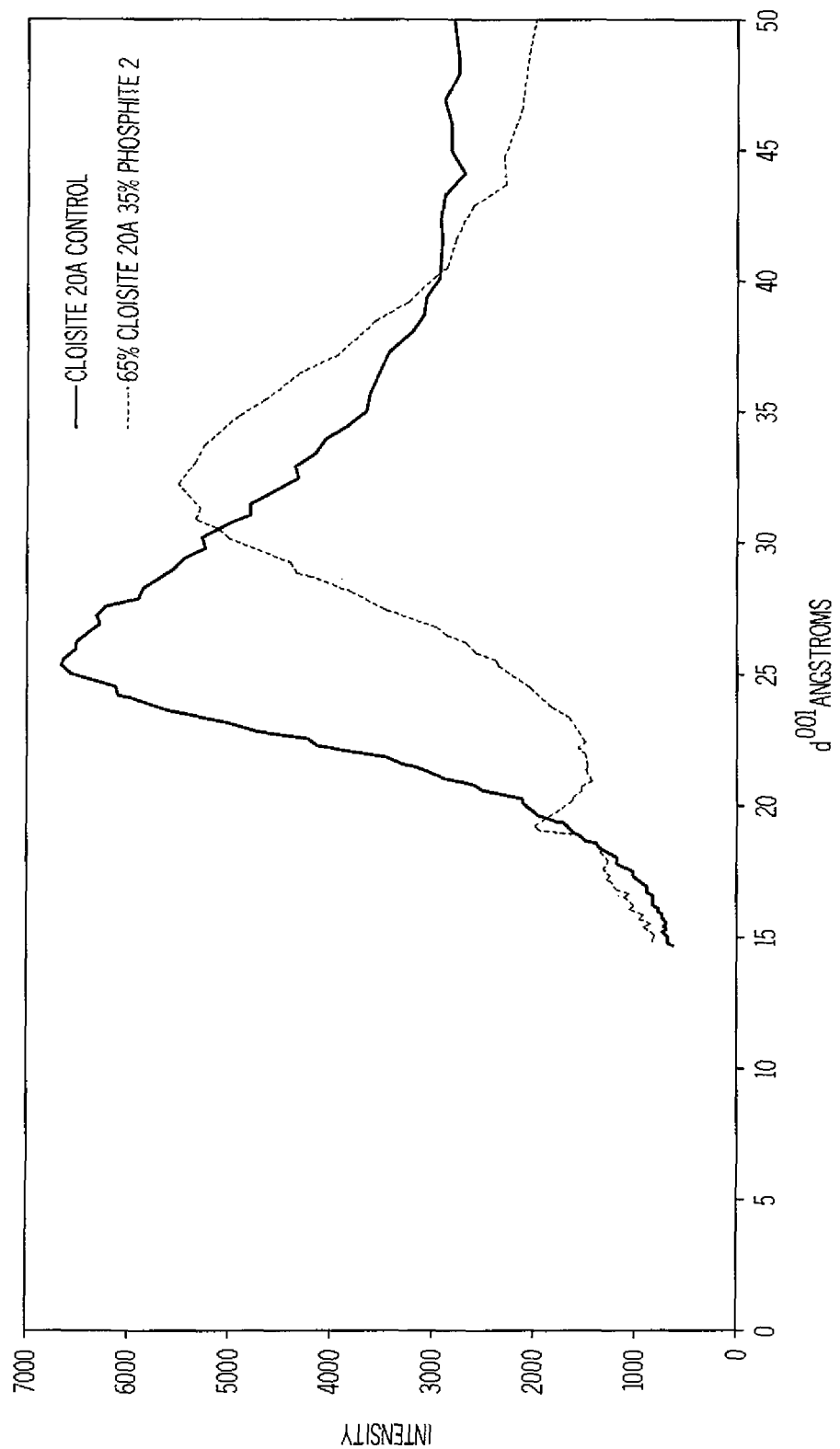
Figure 4:
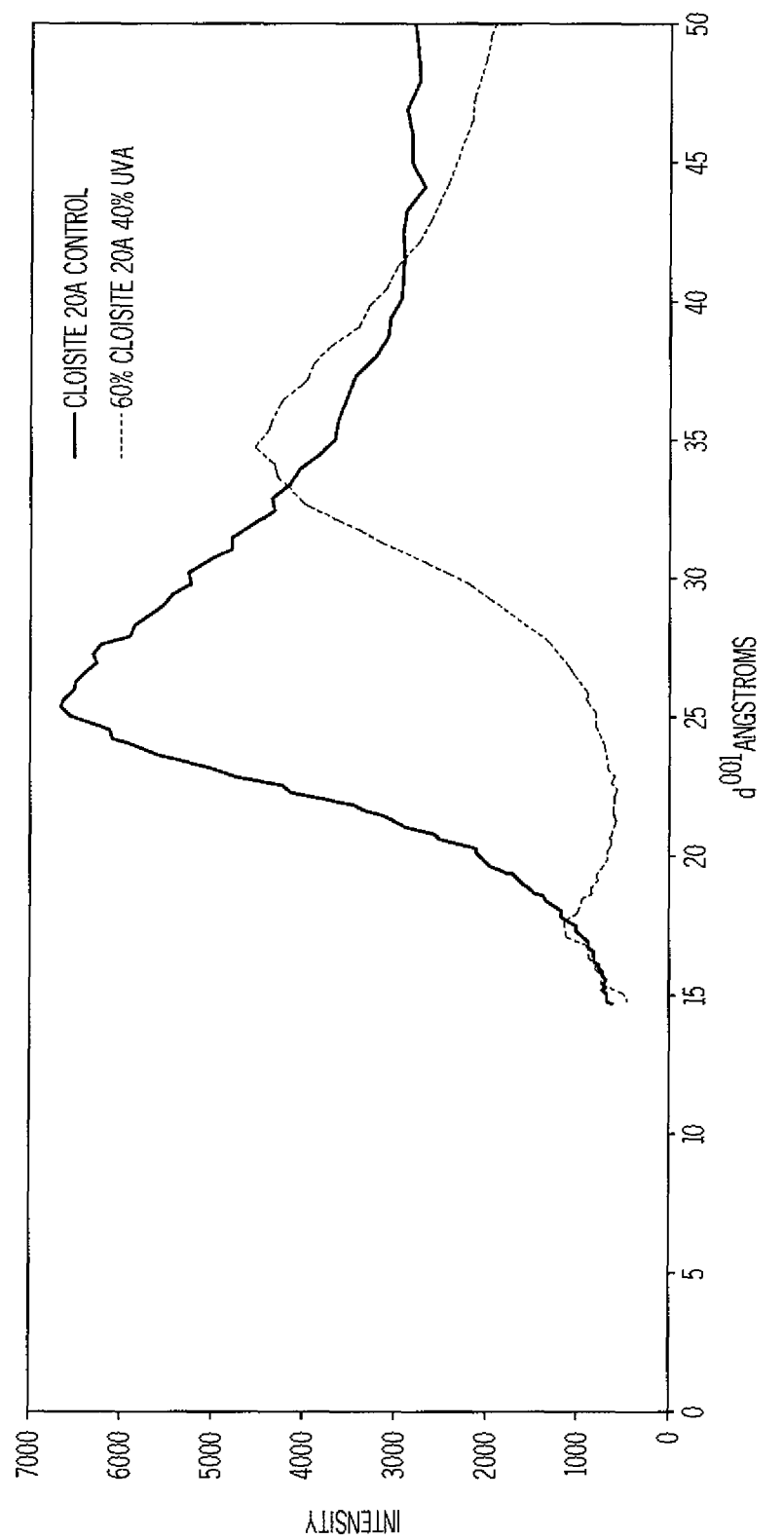
Figure 5:
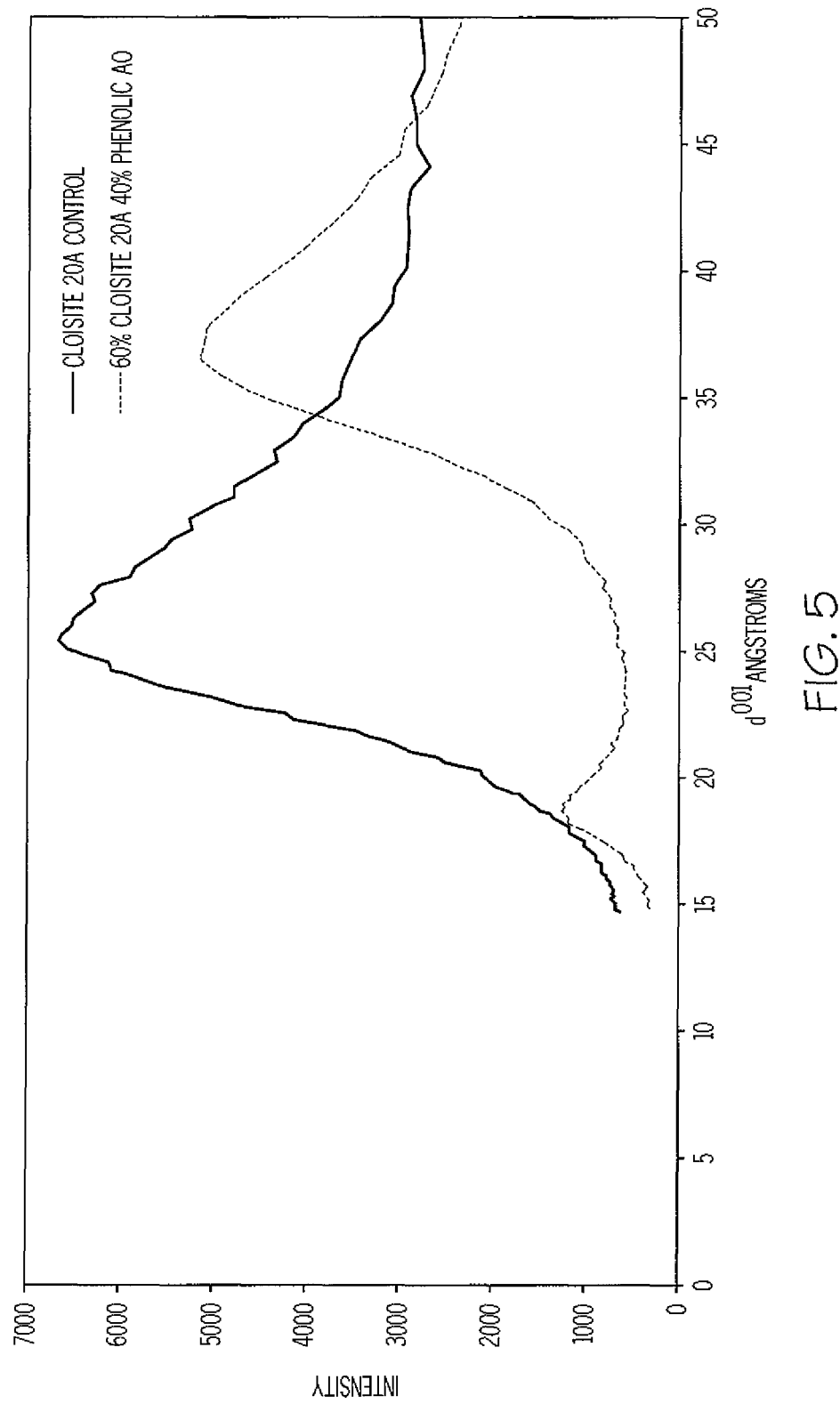
Figure 6:
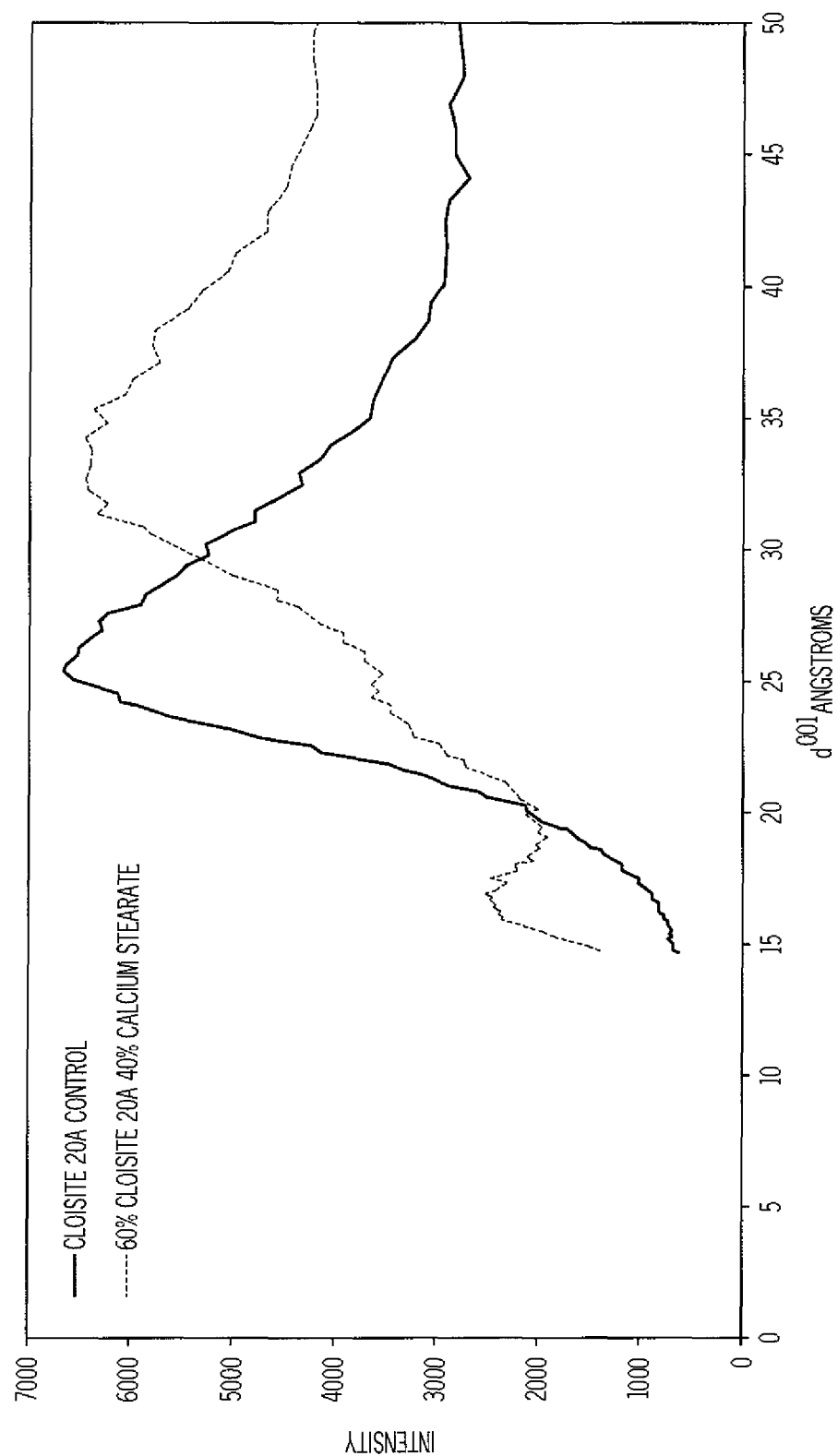
Figure 7:
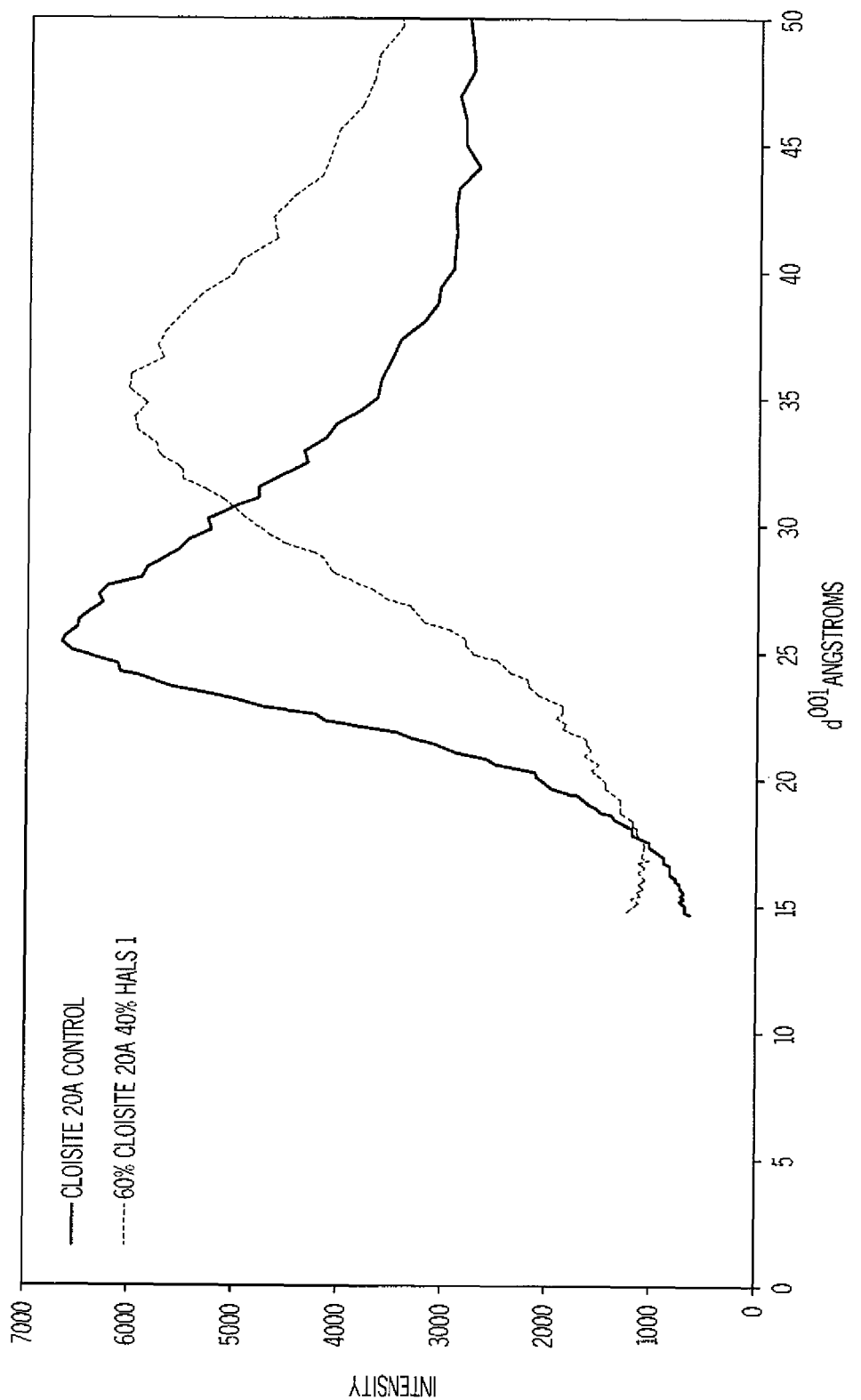
Figure 8:
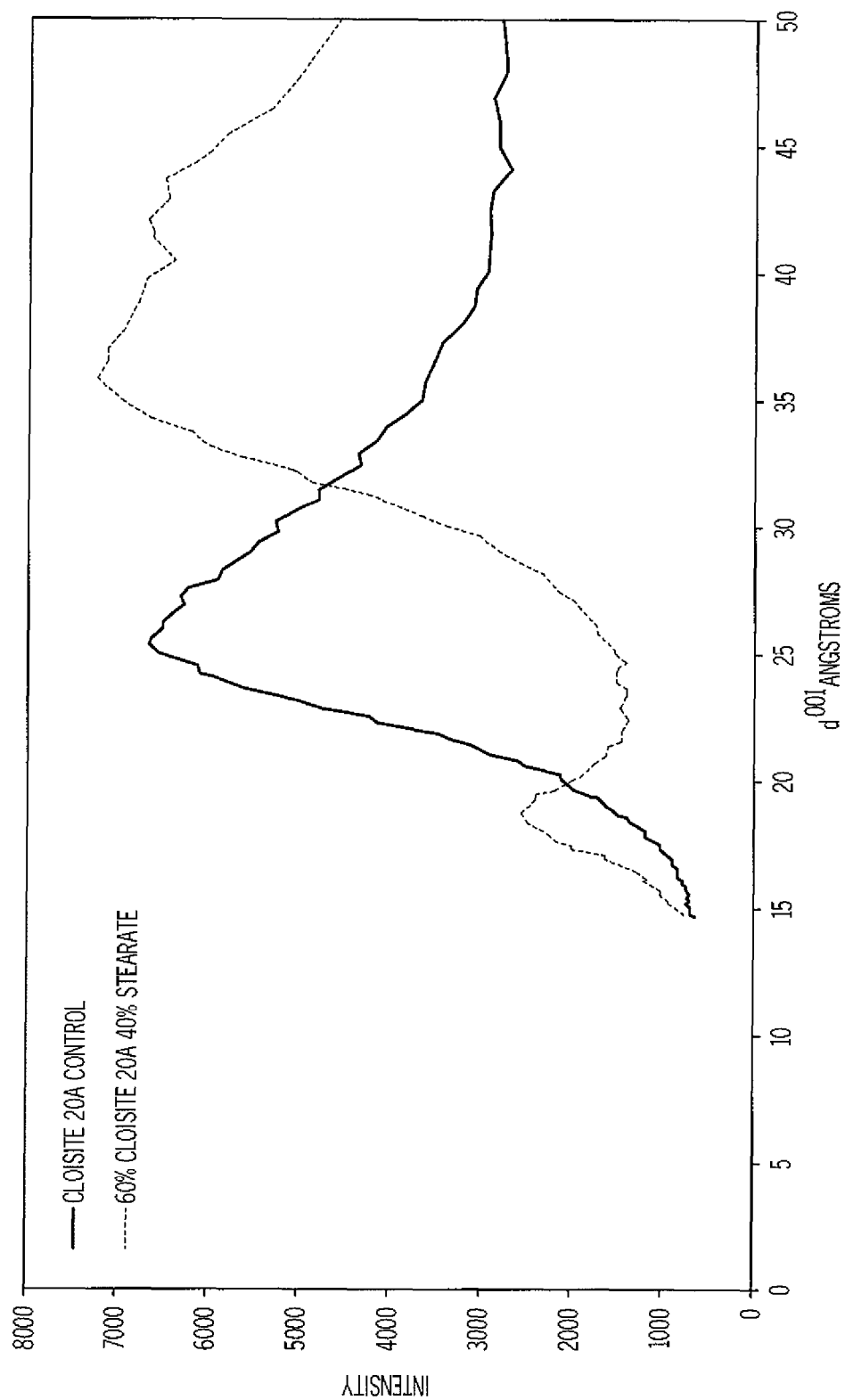
Figure 9:
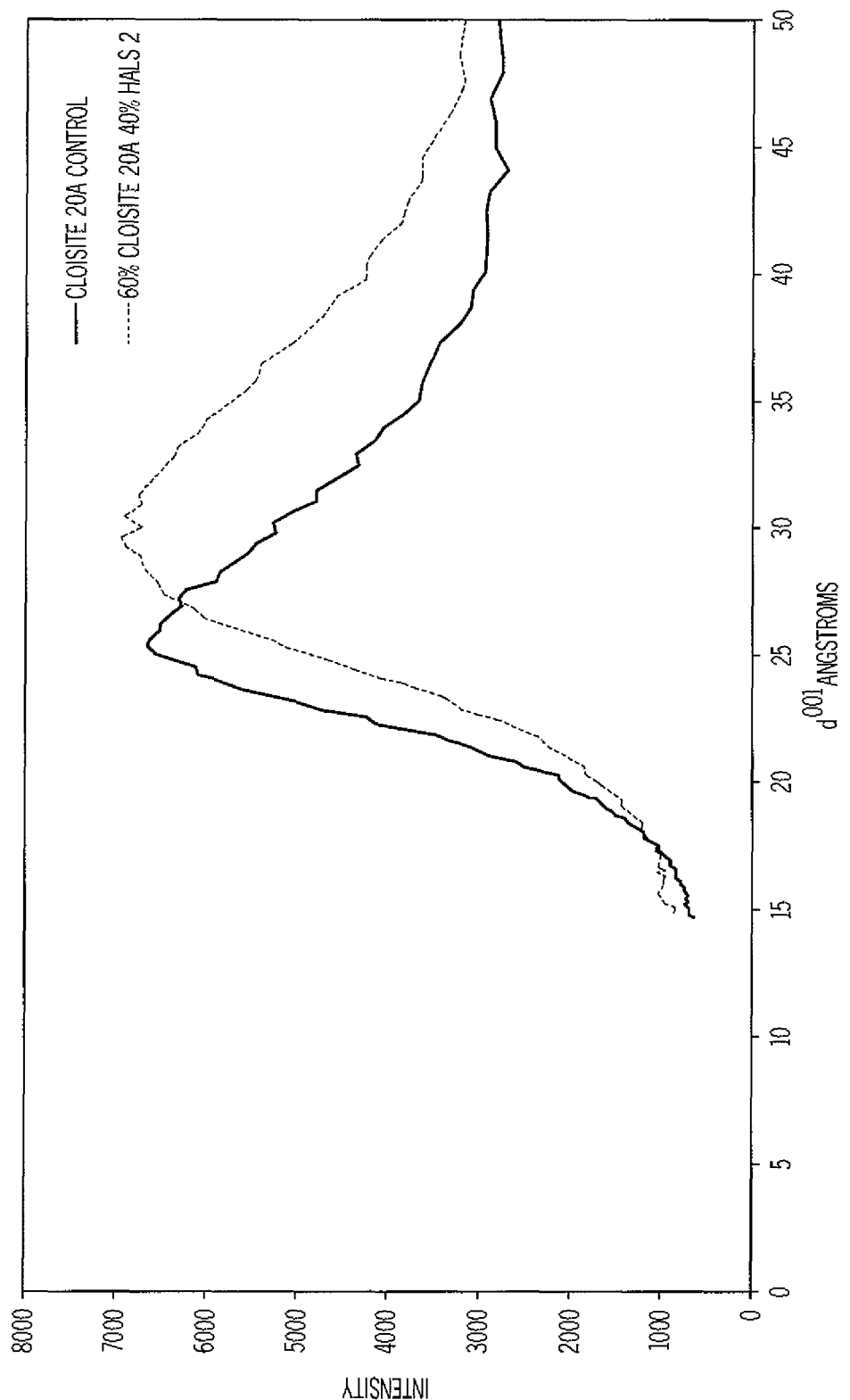

Pre-exfoliated layered materials are provided. The layered materials are natural or synthetic and are modified or unmodified.

The layered materials are for instance one or more materials selected from the group consisting of layered silicates, graphites, vertisols, layered double hydroxides, fullerenes, carbon nanotubes, silicas, polyhedral oligomeric silsesquioxanes, nanometals, metal oxides, metal organic frameworks and zeolites.

The layered materials are for example kaolins, smectites, illite, chlorites or other 2:1 clay types. In particular, the layered materials are one or more compounds selected from montmorillonite, bentonite, beidellite, mica, hectorite, saponite, nontronite, sauconite, vermiculite, ledikite, magatite, kenyaite, stevensite, volkonskoite, hydrotalcite, illite, kaolinite, wollastonite, attapulgite, sepiolite, halloysite, talcum and silica. The layered materials may be modified via ion exchange by onium ions, for example primary, secondary, tertiary or quaternary ammonium cations or phosphonium cations. Examples are distearyldimethylammonium, stearylbenzyldimethylammonium, dimethyl di-tallow ammonium, trioctylmethyl ammonium, dipolyoxyethylenealkylmethyl ammonium, polyoxypropylenemethyldiethyl ammonium, octadecylmethyl bis(polyoxyethylene[15]) ammonium, (meth)acrylate ammonium cations such as 2-(dimethylammonium ethyl methacrylate, cetyl trialkyl ammonium, cetyl vinyl dialkyl ammonium, tetrabutylphosphonium or octadecyl triphenyl phosphonium.

The modifying agents may also be amines, for example the corresponding amines of the ammonium compounds, for instance stearylamine, stearyldiethoxyamine, aminododecanoic acid, octadecylamine or triethoxysilanyl-propylamine. Other modifying agents include silanes such as triethoxyoctylsilane, sulphonium or pyridinium compounds as disclosed for instance in U.S. Pat. No. 6,815,489, and block or graft copolymers such as polyethyleneoxide-b-polystyrene or poly-4-vinylpyridine-b-polystyrene; or solvents such as γ-butyrolactone, 2-pyrrolidone, dimethylsulphoxide, diglyme, tetrahydrofuran or furfuryl alcohol.

The layered materials comprise a nanoscaled space between layers termed a "gallery". This space is on the order of about 1 or 2 nm. In the present pre-exfoliation process the gallery is expanded to ≥2.5 nm, resulting in a pre-exfoliated layered material. For instance, the present process results in a layered material with the gallery expanded to ≥3, 3.5, 4, 4.5, 5, 5.5, 6, 6.5, 7, 7.5, 8, 8.5, 9 or ≥10 nm. The present process for instance results in the gallery being expanded to a distance between 3 nm and 20 nm. That is to say, the pre-exfoliation results in gallery expansion of ≥0.5 nm, for instance ≥1 nm, ≥1.5 nm, ≥2 nm, ≥2.5 nm, ≥3 nm, ≥3.5 nm, ≥4 nm, ≥4.5 nm or ≥5 nm. In fully exfoliated layered materials the gallery is expanded to ≥20 nm, resulting in true separation of the layers. When the present pre-exfoliated layered material/additive mixture is melt blended with a polymer, a true nanocomposite is prepared with gallery expansion of ≥20 nm.

The plastics additives are selected from the group consisting of ultraviolet light absorbers, hindered amine light stabilizers, antioxidants, colorants, flame retardants, antimicrobials and fatty acid additives. The additives are liquids or meltable solids. The additives advantageously have a melting point of ≤350° C., ≤325° C., ≤300° C., ≤275° C., ≤250° C., ≤225° C. or ≤200° C. Additives with melting points above 350° C. are "high melting" and additives that decompose rather than melt, or that do not melt, are "non-melting".

The ultraviolet (UV) light absorbers are for example selected from the group consisting of hydroxyphenylbenzotriazole, tris-aryl-s-triazine, benzoate, 2-hydroxybenzophenone, acrylate or malonate and oxamide ultraviolet light absorbers (UVAs).

The hydroxyphenylbenzotriazole UVAs are for instance disclosed in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-,phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl)-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-☐-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butyl phenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

The tris-aryl-s-triazine UVAs are for instance those disclosed in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, for example 4,6-bis-(2,4-dimethylphenyl)-2-(2-hydroxy-4-octyloxyphenyl)-s-triazine, CYASORB 1164, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyl-oxycarbonylethylideneoxyphenyl)-s-triazine, 2-phenyl-4-[2-hydroxy-4-(3-sec-butyloxy-2-hydroxy-propyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio,2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis [2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2, 4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, TINUVIN 400, 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

Benzoate UV absorbers are for instance esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2-Hydroxybenzophenone UV absorbers are for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Acrylate and malonate UV absorbers are, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, dimethyl p-methoxybenzylidenemalonate (CAS#7443-25-6), and di-(1,2,2,6,6-pentamethylpiperidin-4-yl) p-methoxybenzylidenemalonate (CAS #147783-69-5).

Oxamide UV absorbers are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Many of the UVAs are commercial, for example under the tradenames TINUVIN, CYASORB, CHIMASSORB and SANDUVOR, such as TINUVIN 326, TINUVIN 234, TINUVIN 1577, TINUVIN 1600, CYASORB UV 1164, CYASORB THT, CYASORB UV 2908, CHIMASSORB 81, TINUVIN 328, etc.

The hindered amine light stabilizers (HALS) are disclosed for example in U.S. Pat. Nos. 5,004,770, 5,204,473, 5,096, 950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456.

Suitable hindered amine light stabilizers are for example:
(1) 1-cyclohexyloxy-2,2,6,6-tetramethyl-4-octadecylaminopiperidine,
(2) bis(2,2,6,6-tetramethylpiperidin-4-yl) sebacate,
(3) bis(1-acetoxy-2,2,6,6-tetramethylpiperidin-4-yl) sebacate,
(4) bis(1,2,2,6,6-pentamethylpiperidin-4-yl) sebacate,
(5) bis(1-cyclohexyloxy-2,2,6,6-tetramethylpiperidin-4-yl) sebacate,
(6) bis(1-octyloxy-2,2,6,6-tetramethylpiperidin-4-yl) sebacate;
(7) bis(1-acyl-2,2,6,6-tetramethylpiperidin-4-yl) sebacate,
(8) bis(1,2,2,6,6-pentamethyl-4-piperidyl) n-butyl-3,5-di-tert-butyl-4-hydroxybenzylmalonate
(9) 2,4-bis[(1-cyclohexyloxy-2,2,6,6-tetramethylpiperidin-4-yl)butylamino]-6-(2-hydroxy-ethylamino-s-triazine,
(10) bis(1-cyclohexyloxy-2,2,6,6-tetramethylpiperidin-4-yl) adipate,
(11) 2,4-bis[(1-cyclohexyloxy-2,2,6,6-piperidin-4-yl)butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-tetramethylpiperidine,
(14) 1-(2-hydroxy-2-methylpropoxy)-4-octadecanoyloxy-2, 2,6,6-tetramethylpiperidine,
(15) bis(1-(2-hydroxy-2-methylpropoxy)-2,2,6,6-tetramethylpiperidin-4-yl) sebacate,
(16) bis(1-(2-hydroxy-2-methylpropoxy)-2,2,6,6-tetramethylpiperidin-4-yl) adipate,
(17) 2,4-bis{N-[1-(2-hydroxy-2-methylpropoxy)-2,2,6,6-tetramethylpiperidin-4-yl]-N-butylamino}-6-(2-hydroxyethylamino)-s-triazine,
(18) 4-benzoyl-2,2,6,6-tetramethylpiperidine,
(19) di-(1,2,2,6,6-pentamethylpiperidin-4-yl) p-methoxybenzylidenemalonate,
(20) 2,2,6,6-tetramethylpiperidin-4-yl octadecanoate,
(21) bis(1-octyloxy-2,2,6,6-tetramethylpiperidyl) succinate,
(22) 1,2,2,6,6-pentamethyl-4-aminopiperidine,
(23) 2-undecyl-7,7,9,9-tetramethyl-1-oxa-3,8-diaza-4-oxospiro[4,5]decane,
(24) tris(2,2,6,6-tetramethyl-4-piperidyl) nitrilotriacetate,
(25) tris(2-hydroxy-3-(amino-(2,2,6,6-tetramethylpiperidin-4-yl)propyl) nitrilotriacetate,
(26) tetrakis(2,2,6,6-tetramethyl-4-piperidyl)-1,2,3,4-butane-tetracarboxylate,

(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrrolidin-2,5-dione,
(32) 3-dodecyl-1-(1,2,2,6,6-pentamethyl-4-piperidyl)pyrrolidine-2,5-dione,
(33) N,N'-bis-formyl-N,N'-bis(2,2,6,6-tetramethyl-4-piperidyl)hexamethylenediamine,
(34) reaction product of 2,4-bis[(1-cyclohexyloxy-2,2,6,6-piperidin-4-yl)butylamino]-6-chloro-s-triazine with N,N'-bis(3-aminopropyl)ethylenediamine),
(35) condensate of 1-(2-hydroxyethyl)-2,2,6,6-tetramethyl-4-hydroxypiperidine and succinic acid,
(36) condensate of N,N'-bis(2,2,6,6-tetramethyl-4-piperidyl)-hexamethylenediamine and 4-tert-octylamino-2,6-dichloro-1,3,5-triazine,
(37) condensate of N,N'-bis(2,2,6,6-tetramethyl-4-piperidyl)-hexamethylenediamine and 4-cyclohexylamino-2,6-dichloro-1,3,5-triazine,
(38) condensate of N,N'-bis-(2,2,6,6-tetramethyl-4-piperidyl)hexamethylenediamine and 4-morpholino-2,6-dichloro-1,3,5-triazine,
(39) condensate of N,N'-bis-(1,2,2,6,6-pentamethyl-4-piperidyl)hexamethylenediamine and 4-morpholino-2,6-dichloro-1,3,5-triazine,
(40) condensate of 2-chloro-4,6-bis(4-n-butylamino-2,2,6,6-tetramethylpiperidyl)-1,3,5-triazine and 1,2-bis(3-aminopropylamino)ethane,
(41) condensate of 2-chloro-4,6-di-(4-n-butylamino-1,2,2,6,6-pentamethylpiperidyl)-1,3,5-triazine and 1,2-bis-(3-aminopropylamino)ethane,
(42) a reaction product of 7,7,9,9-tetramethyl-2-cycloundecyl-1-oxa-3,8-diaza-4-oxospiro[4,5]decane and epichlorohydrin,
(43) poly[methyl, (3-oxy-(2,2,6,6-tetramethylpiperidin-4-yl)propyl)]siloxane, CAS#182635-99-0,
(44) reaction product of maleic acid anhydride-$C_8$-$C_{22}$-$\alpha$-olefin-copolymer with 2,2,6,6-tetramethyl-4-aminopiperidine,
(45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,
(46) oligomeric condensate of 4,4'-hexamethylenebis(amino-1,2,2,6,6-pentaamethyl-piperidine) and 2,4-dichloro-6-[(1,2,2,6,6-pentaamethylpiperidin-4-yl)butylamino]-s-triazine end-capped with 2-chloro-4,6-bis(dibutylamino)-s-triazine,
(47) oligomeric condensate of 4,4'-hexamethylenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine,
(48) oligomeric condensate of 4,4'-hexamethylenebis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine and
(49) product obtained by reacting a product, obtained by reacting 1,2-bis(3-amino-propylamino)ethane with cyanuric chloride, with (2,2,6,6-tetramethylpiperidin-4-yl) butylamine.

Also included are the sterically hindered N—H, N-methyl, N-methoxy, N-propoxy, N-octyloxy, N-cyclohexyloxy, N-acyloxy and N-(2-hydroxy-2-methylpropoxy) analogues of any of the above mentioned compounds. For example, replacing an N—H hindered amine with an N-methyl hindered amine would be employing the N-methyl analogue in place of the N—H.

For illustrative purposes, some of the structures for the above-named compounds are shown below.

(6)

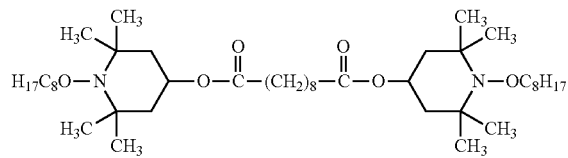

(8)

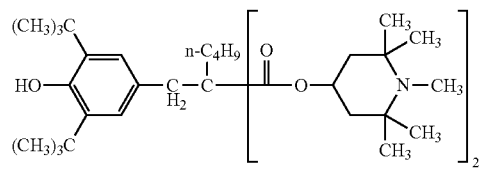

(9)

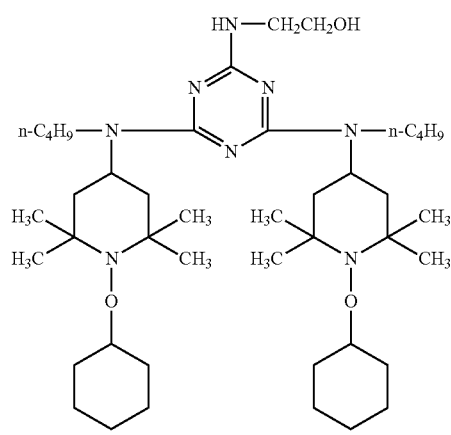

(12)

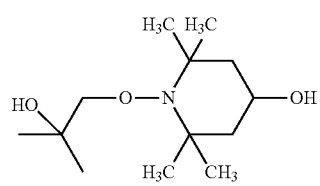

-continued
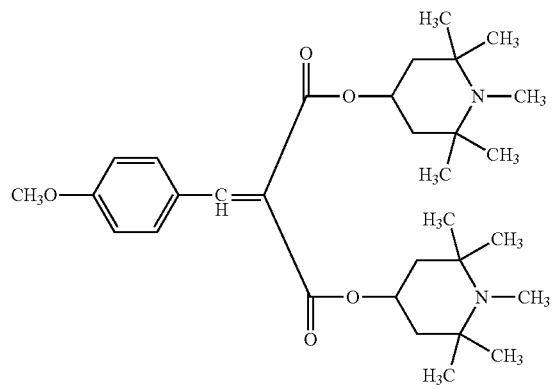
(19)
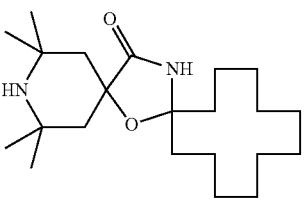
(23)
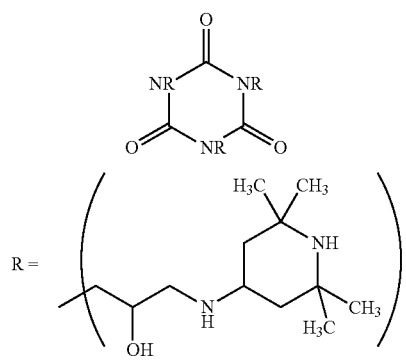
(25)
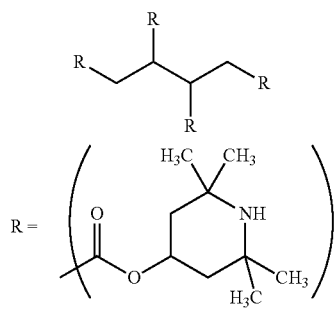
(26)
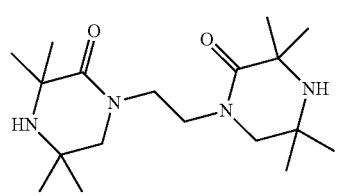
(28)
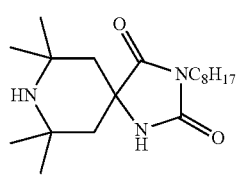
(29)
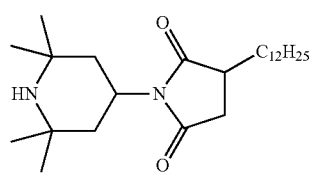
(31)
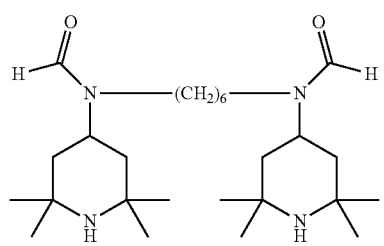
(33)

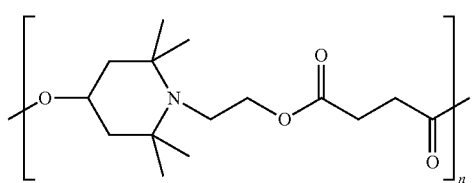
(34)
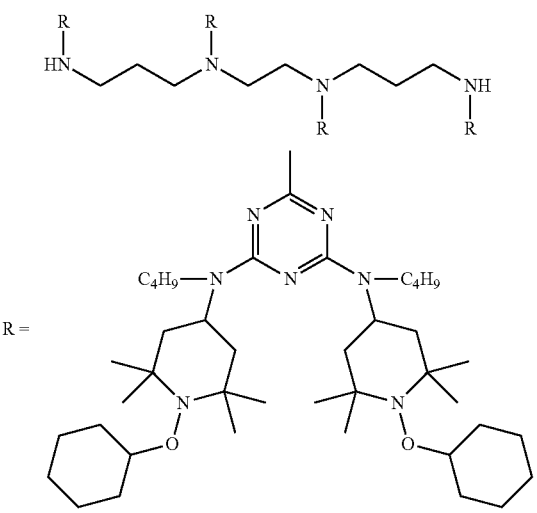
(35)
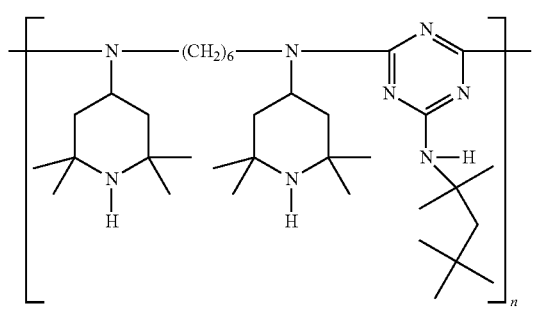
(36)
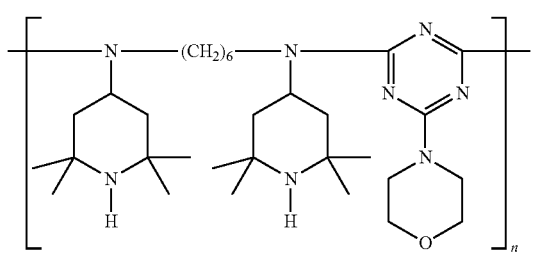
(38)
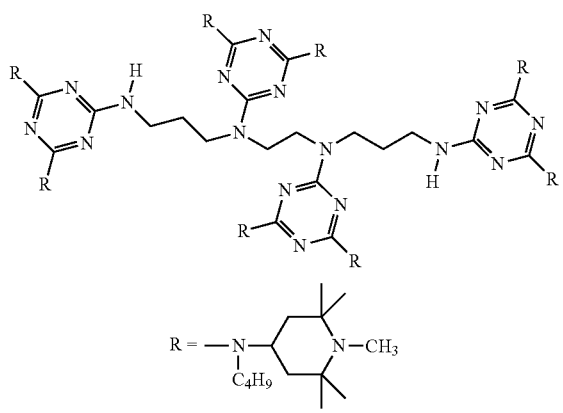
(41)
(42)
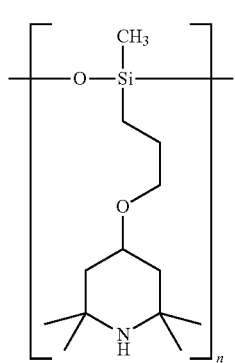
(43)
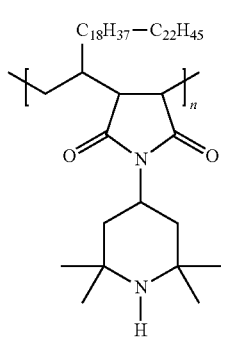
(44)

(45)

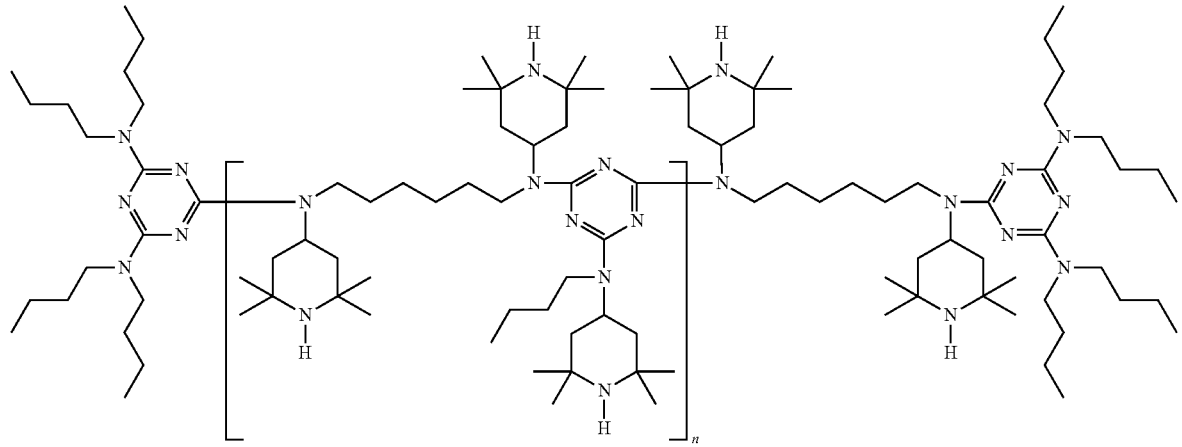

(49)

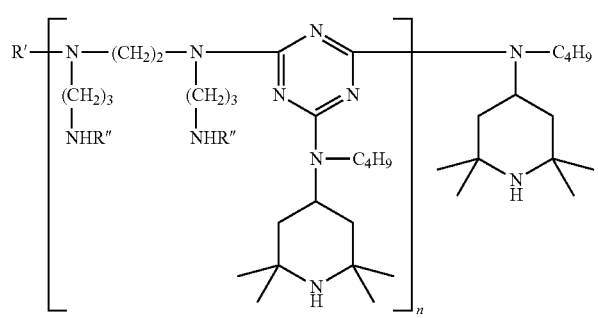

where R' = R" or H and where R" =

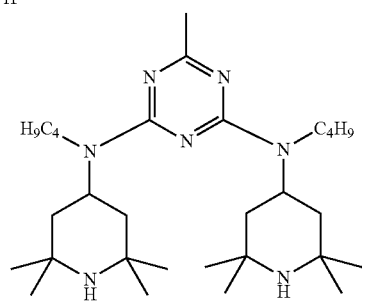

The antioxidants are for instance one or more compounds selected from the group consisting of organic phosphorus stabilizers, hindered phenolic antioxidants, aminic antioxidants, dialkylhydroxylamine stabilizers, amine oxide stabilizers, benzofuranone stabilizers and thiosynergists.

The organic phosphorus stabilizers are for example known phosphite and phosphonite stabilizers and include triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, bis(2,4-di-α-cumylphenyl) pentaerythrtitol diphosphite, diisodecyl pentaerythritol diphosphite, bis(2,4-di-tert-butylphenyl) pentaerythritol diphosphite (D), bis(2,6-di-tert-butyl-4-methylphenyl) pentaerythritol diphosphite (E), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis (2,4-di-tert-butylphenyl) 4,4'-biphenylene-diphosphonite (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2] dioxaphosphocin (A), bis(2,4-di-tert-butyl-6-methylphenyl) methyl phosphite, bis(2,4-di-tert-butyl-6-methylphenyl) ethyl phosphite (G), 2,2',2"-nitrilo[triethyltris(3, 3'5,5'-tetra-tert-butyl-1,1'-biphenyl-2,2'-diyl)phosphite](B), bis(2,4-di-t-butylphenyl) octylphosphite, poly(4,4'-{2,2'-dimethyl-5, 5'-di-t-butylphenylsulfide-}octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite),

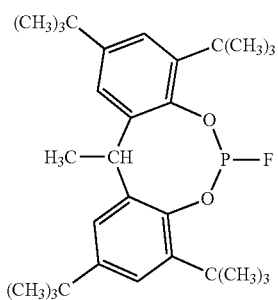 (A)
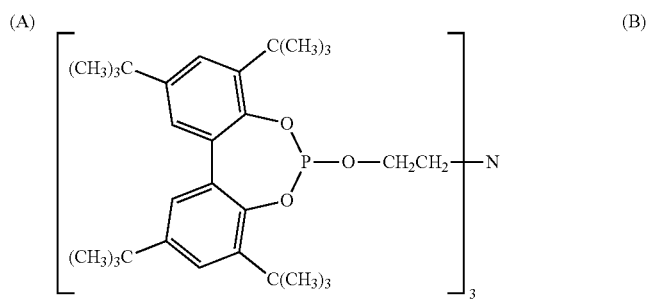 (B)
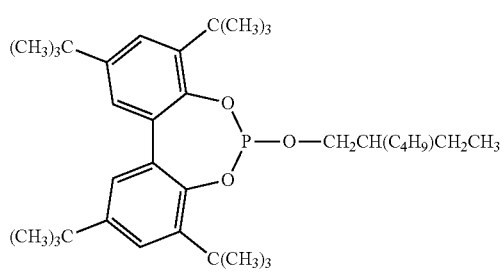 (C)
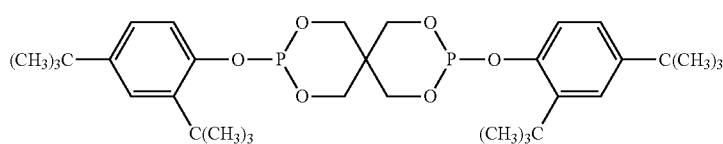 (D)
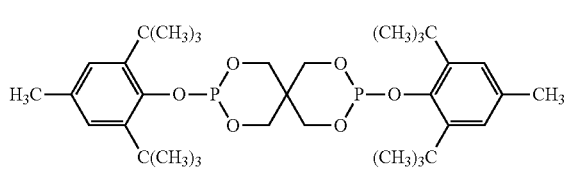 (E)
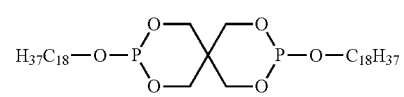 (F)
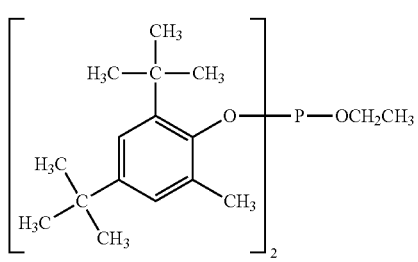 (G)
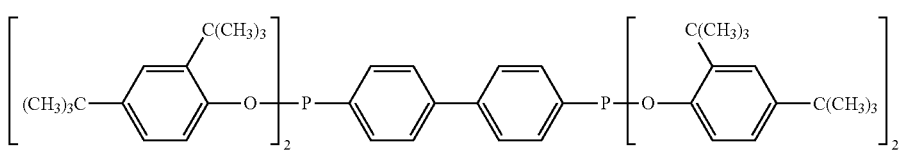 (H)
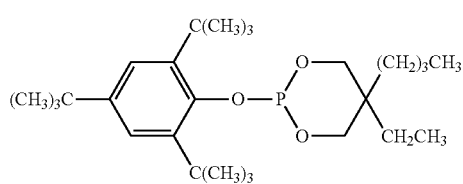 (J)

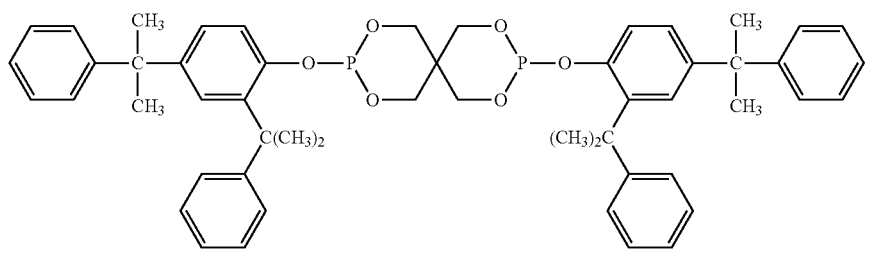

(K)

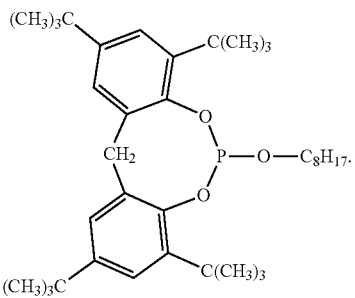

(L)

and

The hindered phenolic antioxidants are for example compounds of groups 1-17:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxy-methylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

4. Tocopherols, for example α-tocopherol, 3-tocopherol, γ-tocopherol, 8-tocopherol and mixtures thereof (Vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl) disulfide.

6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl) sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5, 6-tetramethylbenzene, 2,4,6-tris(3,5-di-tert-butyl-4-hydroxybenzyl)phenol. [0048]10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl) isocyanurate.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl]oxamide (NAUGARDXL-1 supplied by Uniroyal).

Hindered phenolic antioxidants include for example tris (3,5-di-tert-butyl-4-hydroxybenzyl) isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis [3-(3,5-di-tert-butyl-4-hydroxyphenyl) propionate] or octadecyl 3-(3,5-di-tert-butyl-4-hydroxyphenyl) propionate.

Aminic antioxidants are for example N,N'-di-isopropyl-p-phenylenediamine, N,N'-di-sec-butyl-p-phenylenediamine, N,N'-bis(1,4-dimethylpentyl)-p-phenyienediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene.

Hydroxylamine stabilizers are for example N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or N,N-di($C_{16}$-$C_{18}$alkyl) hydroxylamine.

The amine oxide stabilizer is for instance a di($C_{16}$-$C_{18}$) alkyl methyl amine oxide, CAS#204933-93-7.

Benzofuranone stabilizers are for example those disclosed in U.S. Pat. Nos. 4,325,863, 4,338,244, 5,175,312, 5,216, 052, 5,252,643 5,369,159 5,356,966 5,367,008 5,428,177 or 5,428,162 or U.S. Pub. No. 2012/0238677 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy)phenyl]benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2-acetyl-5-isooctylphenyl)-5-isooctyl-benzofuran-2-one and 3-(2,3-dimethylphenyl)-5,7-di-tert-butyl-benzofuran-2-one.

A suitable thiosynergist is dilauryl thiodipropionate or distearyl thiodipropionate.

Ascorbic acid (Vitamin C) is also included as an antioxidant.

The colorants are for example selected from the group consisting of organic pigments, inorganic pigments and mixtures thereof. Some suitable examples may be found in Pigment Handbook, T. C. Patton, Ed., Wiley-Interscience, New York, 1973. Any of the commercial pigments used in polymer based products can be utilized in the present compositions such as: metallic oxides, such as titanium dioxide, zinc oxide, aluminum oxide and iron oxide, metal hydroxide, metal flakes, such as aluminum flake, chromates, such as lead chromate, sulfides, sulfates, carbonates, carbon black, bismuth vanadate, silica, talc, china clay, phthalocyanine blues and greens, organo reds, organo maroons, pearlescent pigments and other organic pigments. If desired chromate-free pigments, such as barium metaborate, zinc phosphate, aluminum triphosphate and mixtures thereof, can also be used.

Some useful pigments include C.I. Pigments: Black 12, Black 26, Black 28, Black 30, Blue 15.0, Blue 15.3 (G), Blue 15.3 (R), Blue 28, Blue 36, Blue 385, Brown 24, Brown 29, Brown 33, Brown 10P850, Green 7 (Y), Green 7 (B), Green 17, Green 26, Green 50, Violet 14, Violet 16, Yellow 1, Yellow 3, Yellow 12, Yellow 13, Yellow 14, Yellow 17, Yellow 62, Yellow 74, Yellow 83, Yellow 164, Yellow 53, Red 2, Red 3 (Y), Red 3 (B), Red 4, Red 48.1, Red 48.2, Red 48.3, Red 48.4, Red 52.2, Red 49.1, Red 53.1, Red 57.1 (Y), Red 57.1 (B), Red 112, Red 146, Red 170 (F5RK Type) Bluer, C.I. Pigment Orange 5, Pigment Orange 13, Pigment Orange 34, Pigment Orange 23 (R), and Pigment Orange 23 (B). Some useful organic pigments include: Pigment Yellow 151, Pigment Yellow 154, Pigment Yellow 155, Pigment Red 8, Pigment Red 8, Pigment Red 49.2, Pigment Red 81, Pigment Red 169, Pigment Blue 1, Pigment Violet 1, Pigment Violet 3, Pigment Violet 27, Pigment Red 122, Pigment Violet 19. Some useful inorganic pigments include Middle Chrome, Lemon Chrome, Prime-Rose Chrome, Scarlet Chrome, and Zinc Chromate.

The present organic pigments are for instance selected from the group consisting of phthalocyanines, perylenes, azo compounds, isoindolines, quinophthalones, diketopyrrolopyrroles, qyinacridones, dioxazines and indanthrones. The blue pigments are for example of the indanthrone and the copper phthalocyanine classes, for instance Pigment Blue 60, Pigment Blue 15:1, Pigment Blue 15:3, Pigment Blue 15:4 and Pigment Blue 15:6. The green pigments are for example of the copper phthalocyanine class, for instance Pigment Green 7 and Pigment Green 36. The magenta pigments are for instance of the quinacridone class, for example 2,9-dichloro quinacridone, Pigment Red 202. The red pigments are for instance of the quinacridone class, for instance dimethyl quinacridone, Pigment Red 122, or of the perylene class, for instance Pigment Red 149, Pigment Red 178 and Pigment Red 179, or of the diketopyrrolopyrrole class, for instance Pigment Red 254 and Pigment Red 264. The yellow pigments are for instance of the pteridine, isoindolinone, and isoindoline classes, for example Pigment Yellow 215, Pigment Yellow 110, and Pigment Yellow 139. The orange pigments are of the isoindolinone or diketopyrrolopyrrole class, for instance Pigment Orange 61, Pigment Orange 71, and Pigment Orange 73. The violet pigments are for instance of the quinacridone class, for instance pigment violet 19 or of the dioxazine class, for instance pigment violet 23 or pigment violet 37. Advantageously, mixtures of pigments may be employed.

Suitable flame retardants include chlorinated flame retardants, brominated flame retardants, phosphorus based flame retardants and melamine based compounds.

Chlorinated flame retardants are disclosed in U.S. Pat. Nos. 6,472,456, 5,393,812, 7,230,042 and 7,786,199. Chlorinated flame retardants are for example tris(2-chloroethyl) phosphite, bis-(hexachlorocycloentadeho) cyclooctane, tris (1-chloro-2-propyl)phosphate, tris(2-chloroethyl)phosphate, bis(2-chloroethyl)vinyl phosphate, hexachlorocyclopentadiene, tris(chloropropyl)phosphate, tris(2-chloroethyl)phosphate, tris(chloropropyl)phosphate, polychlorinated biphenyls, mixtures of monomeric chloroethyl phosphonates and high boiling phosphonates, tris(2,3-dichloropropyl)phosphate, chlorendic acid, tetrachlorophthalic acid, poly-β-chloroethyl triphosphonate mixture, bis(hexachlorocyclopentadieno)cyclooctane (DECLORANE PLUS), chlorinated paraffins and hexachlorocyclopentadiene derivatives.

Brominated flame retardants include tetrabromobisphenol A (TBBPA) and its derivatives such as esters, ethers, and oligomers, for example tetrabromophthalate esters, bis(2,3-dibromopropyloxy)tetrabromobisphenol A, brominated carbonate oligomers based on TBBPA, brominated epoxy oligomers based on condensation of TBBPA and epichlorohydrin, and copolymers of TBBPA and 1,2-dibromoethane; dibromobenzoic acid, dibromostyrene (DBS) and its derivatives; ethylenebromobistetrabromophthalimide, dibromoneopentyl glycol, dibromocyclooctane, trisbromoneopentanol, tris(tribromophenyl)triazine, 2,3-dibromopropanol, tribromoaniline, tribromophenol, tetrabromocyclopentane, tetrabromobiphenyl ether, tetrabromodipentaerythritol, decabromodiphenyl ether, tetrabromophthalic anhydride, pentabromotoluene, pentabromodiphenyl ether, pentabromodiphenyl oxide, pentabromophenol, pentabromophenyl benzoate, pentabromoethyl benzene, hexabromocyclohexane, hexabromocyclooctane, hexabromocyclodecane, hexabromocyclododecane, hexabromobenzene, hexabromobiphenyl, octabromobiphenyl, octabromodiphenyl oxide, poly(pentabromobenzyl acrylate), octabromodiphenyl ether, decabromodiphenyl ethane, decabromodiphenyl, brominated trimethylphenylindan, tetrabromochlorotoluene, bis(tetrabromophthalimido)ethane, bis(tribromophenoxy)ethane, brominated polystyrene, brominated epoxy oligomer, polypentabromobenzyl acrylate, dibromopropylacrylate, dibromohexachlorocyclopentadienocyclooctane, N'-ethyl(bis)dibromononboranedicarboximide, tetrabrombisphenol S, N'N'-ethylbis(dibromononbornene)dicarboximide, hexachlorocyclopentadieno-bis-(2,3-dibromo-1-propyl)phthalate, brominated phosphates like bis(2,3-dibromopropyl)phosphate and tris(tribromoneopentyl)phosphate and tris(dichlorobromopropyl) phosphite, N,N'-ethylene-bis-(tetrabromophthalimide), tetrabromophthalic acid diol[2-hydroxypropyl-oxy-2-2-hydroxyethyl-ethyltetrabromophthalate], vinylbromide, polypentabromobenzyl acrylate, polybrominated dibenzo-p-dioxins, tris-(2,3-dibromopropyl)-isocyanurate, ethylene-bis-tetrabromophthalimide and tris(2,3-dibromopropyl)phosphate.

Suitable examples of commercially available brominated flame retardants include polybrominated diphenyl oxide (DE-60F), decabromodiphenyl oxide (decabromodiphenyl ether) (DBDPO; SAYTEX® 102E), tris[3-bromo-2,2-bis(bromomethyl)propyl]phosphate (PB 370®, FMC Corp. or FR 370, ICL/Ameribrom), tris(2,3-dibromopropyl)phosphate, tetrabromophthalic acid, bis-(N,N'-hydroxyethyl)tetrachlorphenylene diamine, tetrabromobisphenol A bis(2,3-dibromopropyl ether) (PE68), brominated epoxy resin, ethylene-bis(tetrabromophthalimide) (SAYTEX® BT-93), octabromodiphenyl ether, 1,2-bis(tribromophenoxy)ethane (FF680), tetrabromo-bisphenol A (SAYTEX® RB100), ethylene bis-(dibromo-norbornanedicarboximide) (SAYTEX® BN-451), tris-(2,3-dibromopropyl)-isocyanurate, hexabromocyclododecane, brominated polystyrene and EMERALD INNOVATION series from Chemtura, for example EMERALD INNOVATION 1000.

The organobromine flame retardant is for instance decabromodiphenyl ether or tris[3-bromo-2,2-bis(bromomethyl)propyl]phosphate.

Phosphorus containing flame retardants may be selected from phosphazene flame retardants, which are disclosed for example in, U.S. Pub. No. 2003/0220422 and U.S. Pat. Nos. 4,079,035, 4,107,108, 4,108,805, 6,265,599, 6,528,559 and 6,740,695. Non-halogenated phosphorous based fire retardants are compounds that include phosphorous, such as triphenyl phosphates, phosphate esters, phosphonium derivatives, phosphonates, phosphoric acid esters and phosphate esters and those described in U.S. Pat. No. 7,786,199. Phosphorous based fire retardants are usually composed of a phosphate core to which is bonded alkyl (generally straight chain) or aryl (aromatic ring) groups. Phosphate esters include, for example, trialkyl derivatives, such as triethyl phosphate, tris(2-ethylhexyl)phosphate, trioctyl phosphate, triaryl derivatives, such as triphenyl phosphate, cresyl diphenyl phosphate and tricresyl phosphate and aryl-alkyl derivatives, such as 2-ethylhexyl-diphenyl phosphate and dimethyl-aryl phosphates and octylphenyl phosphate.

Other examples of phosphorous based flame retardants include diethylenediamine polyphosphate, methylamine boron-phosphate, cyanuramide phosphate, ethanolamine dimethyl phosphate, cyclic phosphonate ester, trialkyl phosphonates, cyanuramide phosphate, aniline phosphate, trimethylphosphoramide, tris(1-aziridinyl)phosphine oxide, bis(5,5-dimethyl-2-thiono-1,3,2-dioxaphosphorinamyl)oxide, dimethylphosphono-N-hydroxymethyl-3-propionamide, tris(2-butoxyethyl)phosphate, tetrakis(hydroxymethyl)phosphonium salts, such as tetrakis(hydroxymethyl)phosphonium chloride and tetrakis(hydroxymethyl)phosphonium sulfate, n-hydroxymethyl-3-(dimethylphosphono)-propionamide, a melamine salt of boron-polyphosphate, an ammonium salt of boron-polyphosphate, triphenyl phosphite, ammonium dimethyl phosphate, melamine orthophosphate, ammonium urea phosphate, ammonium melamine phosphate, a melamine salt of dimethyl methyl phosphonate, a melamine salt of dimethyl hydrogen phosphite and the like.

Melamine based flame retardants include melamine compound/polyol condensates. For instance, as disclosed in U.S. application Ser. No. 10/539,097 (published as WO 2004/055029) and U.S. Pub. No. 2010/152376, where the polyol is a linear, branched or cyclic trihydric, tetrahydric, pentahydric or hexahydric alchol or a linear or cyclic $C_4$-$C_6$ aldose or $C_4$-$C_6$ ketose and where the melamine compound is melamine phosphate, melamine pyrophosphate or melamine polyphosphate. The polyol is preferably pentaerythritol or dipentaerythritol. The melamine compound is preferably melamine phosphate. The molar ratio of melamine compound to the polyol is preferably from about 1:1 to about 4:1. The condensate may further have incorporated therein a dendritic polymer substituted by hydroxy groups, for instance a dendritic polyester or dendritic polyamide. A dendritic polyester is preferably a product of an initiator compound selected from the group consisting of trimethylolpropane, pentaerythritol and ethoxylated pentaerythritol and chain-extending dimethylpropionic acid. A dendritic polyamide is preferably a polycondensate of a cyclic carboxylic acid anhydride and diisopropanolamine.

High melting or non-melting flame retardants may be used together with organic melting flame retardants or one or more other present additives. These include magnesium phosphate, potassium ammonium phosphate, aluminum hydroxide, magnesium hydroxide, aluminum trihydroxide (ATH) and hydroxycarbonate.

High melting or non-melting flame retardants also include red phosphorous, inorganic phosphates, insoluble ammonium phosphate, ammonium polyphosphate, ammonium urea polyphosphate, ammonium orthophosphate, ammonium carbonate phosphate, ammonium urea phosphate, diammonium phosphate, ammonium melamine phosphate, dicyandiamide polyphosphate, polyphosphate, urea phosphate, melamine pyrophosphate, melamine orthophosphate, melamine salt of dimethyl methyl phosphonate, melamine salt of dimethyl hydrogen phosphite, ammonium salt of boron-polyphosphate, urea salt of dimethyl methyl phosphonate, organophosphates, phosphonates and phosphine oxide.

High melting or non-melting flame retardants also include melamine based flame retardants. Melamine based flame retardants are a family of non-halogenated flame retardants that include three chemical groups: (a) melamine (2,4,6-triamino-1,3,5 triazine); (b) melamine derivatives (including salts with organic or inorganic acids, such as boric acid, cyanuric acid, phosphoric acid or pyro/poly-phosphoric acid); and (c) melamine homologues. Melamine derivatives include, for example, melamine cyanurate (a salt of melamine and cyanuric acid), melamine-mono-phosphate (a salt of melamine and phosphoric acid), melamine pyrophosphate and melamine polyphosphate. Melamine homologues include melam (1,3,5-triazin-2,4,6-triamine-n-(4,6-diamino-1,3,5-triazine-2-yl), melem (2,5,8-triamino 1,3,4,6,7,9,9b-heptaazaphenalene) and melon (poly[8-amino-1,3,4,6,7,9,9b-heptaazaphenalene-2,5-diyl).

High melting or non-melting flame retardants include borate fire retardant compounds such as zinc borate, borax (sodium borate), ammonium borate, and calcium borate. Zinc borate is a boron based fire retardant having the chemical composition $xZnO_yB_2O_3.zH_2O$. Zinc borate can be used alone, or in conjunction with other chemical compounds, such as alumina trihydrate, magnesium hydroxide or red phosphorous. It acts through zinc halide or zinc oxyhalide, which accelerate the decomposition of halogen sources and promote char formation.

Antimony trioxide (ATO) may be employed, especially together with a present halogentated flame retardant, i.e. a brominated flame retardant. Combinations of antimony trioxide with decabromodiphenyl ether or tris[3-bromo-2,2-bis(bromomethyl)propyl]phosphate are included.

Examples of other high melting or non-melting flame retardants include metal containing flame retardant substances such as magnesium oxide, magnesium chloride, talcum, alumina hydrate, zinc oxide, alumina trihydrate, alumina magnesium, calcium silicate, sodium silicate, zeolite, sodium carbonate, calcium carbonate, ammonium molybdate, iron oxide, copper oxide, zinc phosphate, zinc chloride, clay, sodium dihydrogen phosphate, tin, molybdenum and zinc.

Antimicrobial compounds are for instance o-benzyl-phenol, 2-benzyl-4-chloro-phenol, 2,4,4'-trichloro-2'-hydroxydiphenyl ether, 4,4'-dichloro-2-hydroxydiphenyl ether, 5-chloro-2-hydroxy-diphenyl-methane, mono-chloro-o-benzyl-phenol, 2,2'-methylenbis-(4-chloro-phenol) or 2,4,6-trichlorophenol.

Antimicrobials are also for instance 3,5-dimethyl-tetrahydro-1,3,5-2H-thiodiazin-2-thione, bis-tributyltinoxide, 4,5-dichlor-2-n-octyl-4-isothiazolin-3-one, N-butyl-benzisothiazoline, 10,10'-oxybisphenoxyarsine, zinc-2-pyridinthiol-1-oxide, 2-methylthio-4-cyclopropylamino-6-($\alpha,\beta$-dimethylpropylamino)-s-triazine, 2-methylthio-4-cyclopropylamino-6-tert-butylamino-s-triazine or 2-methylthio-4-ethylamino-6-($\alpha,\beta$-dimethylpropylamino)-s-triazine, 2,4,4'-trichloro-2'-hydroxydiphenyl ether, 3-idodine-2-propenyl-butylcarbamate (IPBC or iodopropynyl butylcarbamate), carbendazim or thiabendazole.

Fatty acid additives include for instance pentaerythrityl fatty acid esters such as pentaerythrityl tetrastearate and metal salts of fatty acids, for example alkali metal salts and alkaline earth metal salts of higher fatty acids, for example, calcium stearate, zinc stearate, magnesium behenate, magnesium stearate, aluminum stearate, sodium ricinoleate and potassium palmitate, antimony pyrocatecholate or zinc pyrocatecholate.

The weight:weight ratio of layered material to plastics additives is for example from about 1:99 to about 99:1, from about 10:90 to about 90:10, from about 10:60 to about 60:10, from about 20:80 to about 80:20, from about 30:70 to about 70:30 or from about 40:60 to about 60:40. Or the weight:weight ratio of layered material to plastics additive is for example about 50:50, about 40:60, about 30:70, about 20:80 or about 10:90 and levels in between.

The additives are in particular contain a phenolic moiety, a piperidine moiety, a triazole moiety, a triazine moiety, a phosphite moiety or a phosphate moiety.

The present methods do not require high shear processing to prepare a polymer nanocomposite comprising a fully exfoliated layered material.

The present methods of pre-exfoliating the layered materials typically comprise dry blending of components, followed by extrusion. Typically the additive or additive mixture is in a molten state during extrusion. After extrusion, the pre-exfoliated layered material/additive mixture is cooled. The extrudate may be in the form of strands that may be cut into pellets. Alternatively, the extrudate may be pulverized into a powder.

The pre-exfoliation extrusion temperature will be a function of the melting point(s) of the additive or additives. As stated above, the additive or additive mixture is typically in a molten or liquid state during extrusion. Typically, the extrusion temperature will be from about 100° C. to about 225° C. However, employing a liquid additive will allow the extrusion to take place at temperatures below 100° C., for instance about 25° C. or lower. The pre-exfoliation extrusion may advantageously take place at temperatures up to about 350° C., for example up to about 225° C., 250° C., 275° C., 300° C. or 325° C.

If an additive mixture is employed, extrusion may take place above the melting point of one of the additives and below the melting point or decomposition point of the other additives. The non-molten additives may be soluble in the molten additive. For example, certain non-melting or high melting point additives may be employed together with antioxidants, for instance pentaerythritol tetrakis(3-(3,5-di-tert-butyl-4-hydroxyphenyt)propionate) or tris-(2,4-di-tert-butylphenyl)phosphite.

Alternatively, the additives may be semi-solid or liquid; such additives are also easily mixed with the layered material prior to extrusion.

The powder may be blended into a polymer to prepare a polymer/exfoliated layered material/additive masterbatch. A masterbatch will contain from about 2 weight percent to about 70 weight percent of an exfoliated layered material/additive mixture and from about 98 weight percent to about 30 weight percent polymer. Typically from about 10 weight percent to about 50 weight percent exfoliated layered material/additive mixture and from about 90 weight percent to about 50 weight percent polymer. The masterbatch itself may be a true nanocomposite or the layered material may remain pre-exfoliated.

Advantageously, the present pre-exfoliation methods employ little or no components other than the layered material and additive or additives, that is little or no solvents or carrier waxes or polymers. Solvents include water and/or organic solvents. Little means for instance less than 20%, less than 15%, less than 10%, less than 5%, less than 3% or less than 2% by weight other components, based on the weight of the layered material plus polymer additives. "No" means zero.

Alternatively, up to about 50%, up to about 60%, up to about 70% or up to about 80% by weight of a polymer, solvent or carrier wax may be employed in the present methods to prepare a pre-exfoliated layered material.

The pre-exfoliated layered material/additive mixture may be subjected to any of the following: pastillation, prill forming, henschel mixing, spray drying, extrusion, compaction, granulation, shear melt techniques, batch mixing, gas phase absorption, elevated pressure mixing, mill mixing, kneading or thermal fusion.

The pre-exfoliated layered material/additive mixture is advantageously dispersed in a polymer substrate to prepare a polymer nanocomposite via melt blending in an extruder. Again, high shear techniques are not required.

The extrusion temperatures for nanocomposite formation are dependent on whatever temperature the bulk polymer is normally processed at. The present thermoplastics are typically processed at temperatures of from about 140° C. to 3200° C. and possibly higher for specialty resins. For example the extrusion temperatures for nanocomposite formation are about 160° C., about 180° C., about 200° C., about 220° C., about 240° C., about 260° C., about 280° C. or about 300° C.

Present extruders include single screw extruders, twin screw extruders and planetary extruders.

The resulting nanocomposite may be processed according to known techniques into final articles via further extrusion, injection molding, blown film molding, film extrusion, coextrusion, fiber spinning and the like.

Alternatively, a composition comprising a pre-exfoliated layered material/additive mixture and a polymer substrate may be formed into a final article via melt molding conditions (e.g. via injection molding) without prior melt blending in an extruder. Present polymer nanocomposites can be prepared also in this way.

The pre-exfoliated layered materialladditive mixtures are highly valuable intermediates useful in preparing polymer nanocomposites.

The nanocomposites contain for instance about 0.5 percent by weight, about 1, about 1.5, about 2, about 2.5, about 3, about 3.5, about 4, about 4.5 or about 5, about 5.5, about 6, about 6.5, about 7, about 7.5, about 8, about 8.5, about 9, about 9.5 or about 10 percent by weight of the pre-exfoliated layered material/additive mixture, based on the weight of the polymer, and levels in between. Alternatively, the present nanocomposites may contain up to about 20 percent by weight of the pre-exfoliated layered materials.

The nanocomposites contain for instance about 0.1 percent by weight, about 0.5, about 1, about 1.5, about 2, about 2.5, about 3, about 3.5, about 4, about 4.5 or about 5 percent by weight, based on the weight of the polymer, of the layered material. These levels are based on the weight of the layered material prior to pre-exfoliation. Alternatively, the nanocomposites may contain up to about 10 percent by weight layered material, based on the weight of the polymer, for example about 6, about 7, about 8 or about 9 weight percent, based on the weight of the polymer.

The polymers of the nanocomposites are in particular natural or synthetic thermoplastic polymers. For example:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods:

a) radical polymerization (normally under high pressure and at elevated temperature).

b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propy-lene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or □-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an ela-stomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate and polylactic acid (PLA) as well as corresponding polyesters modified with polycarbonates or MBS. The term "polylactic acid (PLA)" designates a homo-polymer of for instance poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxy-valeric acid, 5-hydroxy-valeric acid, 6-hydroxy-caproic acid and cyclic forms thereof; the terms "lactic acid" or "lactide" include L-lactic acid, D-lactic acid, mixtures and dimers thereof, i.e. L-lactide, D-lactide, meso-lacide and any mixtures thereof.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homolo-gous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

Polymers are for Example:
1) Homo and copolymers of olefin monomers such as ethylene and propylene, but also higher 1-olefins such as 1-butene, 1-pentene, 1-hexene or 1-octene. For instance polyethylene, LDPE, LLDPE, HDPE, polypropylene and copolymers of ethylene and propylene.
2) Homo- and copolymers of olefin monomers with diolefin monomers such as butadiene, isoprene and cyclic olefins such as norbornene.
3) Copolymers of one or more 1-olefins and for diolefins with carbon monoxide and/or with other vinyl monomers, including, but not limited to vinyl acetate, vinyl ketone, styrene, maleic acid anhydride and vinyl chloride.
4) Polyvinyl alcohol.
5) Other thermoplastics such as polystyrene, styrene-acrylonitrile copolymer, acrylonitrile-butadiene-styrene copolymer, polyvinyl chloride, polyvinylidene chloride, polyvinyl acetate, polyvinylbutyral, ethylene-vinyl alcohol copolymer, polyethylene terephthalate (PET), polybutylene terephthalate (PBT), liquid crystal polyesters (LCP's), polyacetals (e.g., POM), polyamides (PA), polycarbonates, polyurethane and polyphenylene sulfide (PPS); polymer blends or polymer alloys formed of two or more of these resins; and compounds obtained by adding fillers such as glass fibers, carbon fibers, semi-carbonized fibers, cellulose fibers and glass beads, flame retardants, blowing agents, antimicrobial agents, crosslinking agents, fine polyolefin resin powder, polyolefin waxes, ethylene bisamide waxes, metallic soaps and the like either singly or in combination to these resins. Examples of thermosetting resins, on the other hand, can include thermosetting resins such as epoxy resins, melamine resins and unsaturated polyester resins; and compounds obtained by incorporating fillers such as glass fibers, carbon fibers, semi-carbonized fibers, cellulose fibers and glass beads, flame retardants and the like either singly or in combination to these resins.

Further Polymers are:
Biodegradable polymers of either natural or synthetic origin including but not limited to polyethylensuccinate, polybutylensuccinate, polybutylensuccinate/adipate, polybutylensuccinate/carbonate, polybutylensuccinate/terephtalate, polycaprolactone, poly(hydroxyalkanoates), poly 3-hydroxybutyrate, polylactic acid, polyester amides, or blends of these materials with natural or modified starch, polysaccharides, lignin, wood flour, cellulose or chitin.

The polymer is for instance a thermoplastic natural or synthetic polymer as described above. Polyolefin homo- and copolymers, starch modified polyolefins and starch based polymer composite are included, for example polyethylenes, polypropylenes, polyethylene copolymers, polypropylene copolymers and propylene/ethylene copolymers.

The present disclosure allows nanomaterial technology to be employed wherever plastics additives are used and as the exfoliation does not require high shear, common processing equipment may be employed. The extent of exfoliation is higher than that achieved with high shear techniques. This allows for lower clay loadings to achieve comparable properties.

The present disclosure allows for nanocomposites to be used in any type of thermoplastic with any meltable or liquid additive. The layered materials can enhance modulus, flame retardant, glass transition, tensile, barrier, creep, leaching, strength, carlity, stability, toughness, impact, odor, color, compatibility, dripping, viscosity, flow, blocking, dimensional stability, recycleability, heat distortion, colorfastness, scratch and/or processibility properties.

Also disclosed is a composition consisting of
a pre-exfoliated natural or synthetic, modified or unmodified layered material,
one or more plastics additives selected from the group consisting of ultraviolet light absorbers, hindered amine light stabilizers, antioxidants, colorants, flame retardants, antimicrobials and fatty acid additives and
less than 20%, less than 15%, less than 10%, less than 5%, less than 3% or less than 2% by weight other components.

Also disclosed is a composition consisting of
a pre-exfoliated natural or synthetic, modified or unmodified layered material and
one or more plastics additives selected from the group consisting of ultraviolet light absorbers, hindered amine light stabilizers, antioxidants, colorants, flame retardants, antimicrobials and fatty acid additives.

The U.S. patent applications, U.S. published applications and U.S. patents discussed herein are hereby incorporated by reference.

The term "a" may of course mean "one or more".

The following embodiments are disclosed.

Embodiment 1

A method for preparing a pre-exfoliated layered material, the method comprising mixing a natural or synthetic, modified or unmodified layered material with one or more plastics additives selected from the group consisting of ultraviolet light absorbers, hindered amine light stabilizers, antioxidants, colorants, flame retardants, antimicrobials and fatty acid additives and extruding the mixture.

Embodiment 2

A method according to embodiment 1 where the layered material is selected from the group consisting of layered silicates, graphites, vertisols, layered double hydroxides, fullerenes, carbon nanotubes, silicas, polyhedral oligomeric silsesquioxanes, nanometals, metal oxides, metal organic frameworks, zeolites and mixtures thereof.

Embodiment 3

A method according to embodiment 1 where the layered material is selected from the group consisting of montmorillonite, bentonite, beidellite, mica, hectorite, saponite, nontronite, sauconite, vermiculite, ledikite, magatite, kenyaite, stevensite, volkonskoite, hydrotalcite, illite, kaolinite, wollastonite, attapulgite, sepiolite, halloysite, talcum, silica and mixtures thereof.

Embodiment 4

A method according to any of embodiments 1 to 3, where the layered material is modified.

Embodiment 5

A method according to any of embodiments 1 to 4, where the extrusion occurs above the melting point of at least one of the additives.

Embodiment 6

A method according to any of embodiments 1 to 5, where the one or more plastics additives contain a phenolic moiety, a piperidine moiety, a triazole moiety, a triazine moiety, a phosphite moiety or a phosphate moiety.

Embodiment 7

A method according to any of embodiments 1 to 6, where the one or more plastics additives are selected from the group consisting hydroxyphenylbenzotriazole ultraviolet light absorbers, tris-aryl-s-triazine ultraviolet light absorbers, hindered amine light stabilizers, organic phosphorus stabilizers and hindered phenolic antioxidants.

Embodiment 8

A method according to any of embodiments 1 to 7, where the one or more plastics additives are selected from the group consisting of hindered phenolic antioxidants.

Embodiment 9

A method according to any of embodiments 1 to 8, where the weight:weight ratio of the layered material to the plastics additives is from about 10:90 to about 90:10, from about 20:80 to about 80:20, from about 30:70 to about 70:30, from about 40:60 to about 60:40 or from about 50:50 to about 10:90.

Embodiment 10

A method according to any of embodiments 1 to 9 where the layered material undergoes a gallery expansion of ≥0.5 nm, ≥1 nm, ≥1.5 nm or ≥2 nm.

Embodiment 11

A method according to any of embodiments 1 to 10 where the gallery of the layered material is expanded to ≥3 nm or 3.5 nm.

Embodiment 12

A method according to any of embodiments 1 to 11, where less than 20%, less than 15%, less than 10%, less than 5%, less than 3%, less than 2% or 0% by weight other components, based on the weight of the layered material plus polymer additives, are present.

Embodiment 13

A method according to any of embodiments 1 to 11, where up to about 50%, up to about 60%, up to about 70% or up to about 80% by weight of other components, based on the weight of the layered material plus polymer additives, are present.

Embodiment 14

A pre-exfoliated layered material/additive composition consisting of a pre-exfoliated natural or synthetic, modified or unmodified layered material, one or more plastics additives selected from the group consisting of ultraviolet light absorbers, hindered amine light stabilizers, antioxidants, colorants, flame retardants, antimicrobials and fatty acid additives and less than 20%, less than 15%, less than 10%, less than 5%, less than 3%, less than 2% or 0% by weight other components, based on the weight of the composition.

Embodiment 15

A method for preparing a polymer nanocomposite, comprising combining a pre-exfoliated layered material/additive composition of embodiment 14 with a polymer substrate and melt blending the combination.

Embodiment 16

A method according to embodiment 15, where the polymer is selected from the group consisting of polyolefins, polyamides, polyesters, polystyrenes, polycarbonates, polyurethanes and polyacetals.

Embodiment 17

A method according to embodiment 15, where the polymer is selected from the group consisting of polypropylene, polyethylene and propylene/ethylene copolymer.

Embodiment 18

A nanocomposite comprising a polymer substrate and incorporated therein a pre-exfoliated layered material/additive composition according to embodiment 14.

Embodiment 19

A nanocomposite according to embodiment 18, comprising a polymer substrate and incorporated therein about 0.5 percent by weight, about 1, about 1.5, about 2, about 2.5, about 3, about 3.5, about 4, about 4.5 or about 5 percent by weight, based on the weight of the polymer substrate, of the pre-exfoliated layered material/additive composition.

Composition embodiment 14 may be expanded by any and all of the alternatives and combinations of embodiments 1-13. Thus, method embodiments 15-17 may also be expanded in this way. Method embodiments 15-17 may also be expanded by the alternatives of embodiment 19.

Nanocomposite embodiments 18 and 19 may be expanded by any and all of the alternatives and combinations of embodiments 1-13 and 15-17.

The present nanocomposites exhibit enhanced polymer properties.

The nanocomposites may comprise plastics additives in addition to those of the present pre-exfoliated layered material/additive mixture.

The present pre-exfoliated layered material/additive mixture is able to lower odor associated with volatile compounds during polymer processing.

The present pre-exfoliated layered material/additive mixture is synergistic when employed together with known flame retardants.

Further, when a meltable or liquid flame retardant is employed to prepare a pre-exfoliated layered material/flame retardant mixture, there is an enhancement of flame retardant and mechanical properties of the final plastic article.

The following Examples illustrate embodiments of the disclosure. While the following exemplary embodiments incorporating the principles of the present disclosure are disclosed below herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains.

Example 1 Pre-Exfoliated Modified Montmorillonite

The following formulations 1a through id are prepared. Levels are parts by weight.

| Formulation | CLOISITE 20A | IRGAFOS 168 |
| --- | --- | --- |
| 1a | 75 | 25 |
| 1b | 60 | 40 |
| 1c | 45 | 55 |
| 1d | 35 | 65 |

Each formulation is added to a plastic bag and is dry blended (bag blended) thoroughly followed by extrusion with a small lab scale twin screw Brabender extruder. The zone temperatures are set at a point to ensure melting of IRGAFOS 168. Zone 1=160° C., zone 2 through zone 5=200° C. The extruded materials range from a paste like to plastic like consistency that hardens upon cooling. The cooled samples are pulverized in a laboratory grade blender and characterized by powder X-ray diffraction. FIG. 1 shows the decrease of intensity and shift of the d001 peak to larger gallery spacings with higher concentrations of IRGAFOS 168, indicating pre-exfoliation.

This process is repeated with the following samples. Each additive is molten under the extrusion conditions. Each extruded material has a plastic like consistency and becomes hard upon cooling. FIGS. 2-9 correspond to formulations 2-9 and show the decrease in intensity of the d001 peak indicating pre-exfoliation.

Formulation 2: 175 g CLOISITE 20A and 325 g FR-370 flame retardant

Formulation 3: 600 g CLOISITE 20A and 400 g IRGAFOS 126 organic phosphite antioxidant Formulation 4: 600 g CLOISITE 20A and 400 g TINUVIN 328 ultraviolet light absorber Formulation 5: 600 g CLOISITE 20A and 400 g IRGANOX 1010 hindered phenolic antioxidant Formulation 6: 600 g CLOISITE 20A and 400 g calcium stearate Formulation 7: 600 g CLOISITE 20A and 400 g 1-(2-hydroxy-2-methylpropoxy)-4-octadecanoyloxy-2,2,6,6-tetramethylpiperidine hindered amine light stabilizer Formulation 8: 600 g CLOISITE 20A and 400 g pentaerythrityl tetrastearate Formulation 9: 600 g CLOISITE 20A and 400 g TINUVIN 770 hindered amine light stabilizer CLOISITE 20A, Southern Clay Products, is a natural montmorillonite modified with dimethyl-di-hydrogenated tallow quaternary ammonium (95 meq per 100 g clay). IRGAFOS 168 is tris-(2,4-di-tert-butylphenyl)phosphite. FR-370 is tris(tribromoneopentyl)phosphate. IRGAFOS 126 is bis-(2,4-di-t-butylphenol) pentaerythritol diphosphite. TINUVIN 328 is 2-(2H-benzotriazol-2-yl)-4,6-di-tert-pentylphenol. IRGANOX 1010 is pentaerythritol tetrakis(3-(3, 5-di-tert-butyl-4-hydroxyphenyl)propionate). TINUVIN 770 is bis(2,2,6,6,-tetramethyl-4-piperidyl)sebaceate.

Example 2

Figure 10:
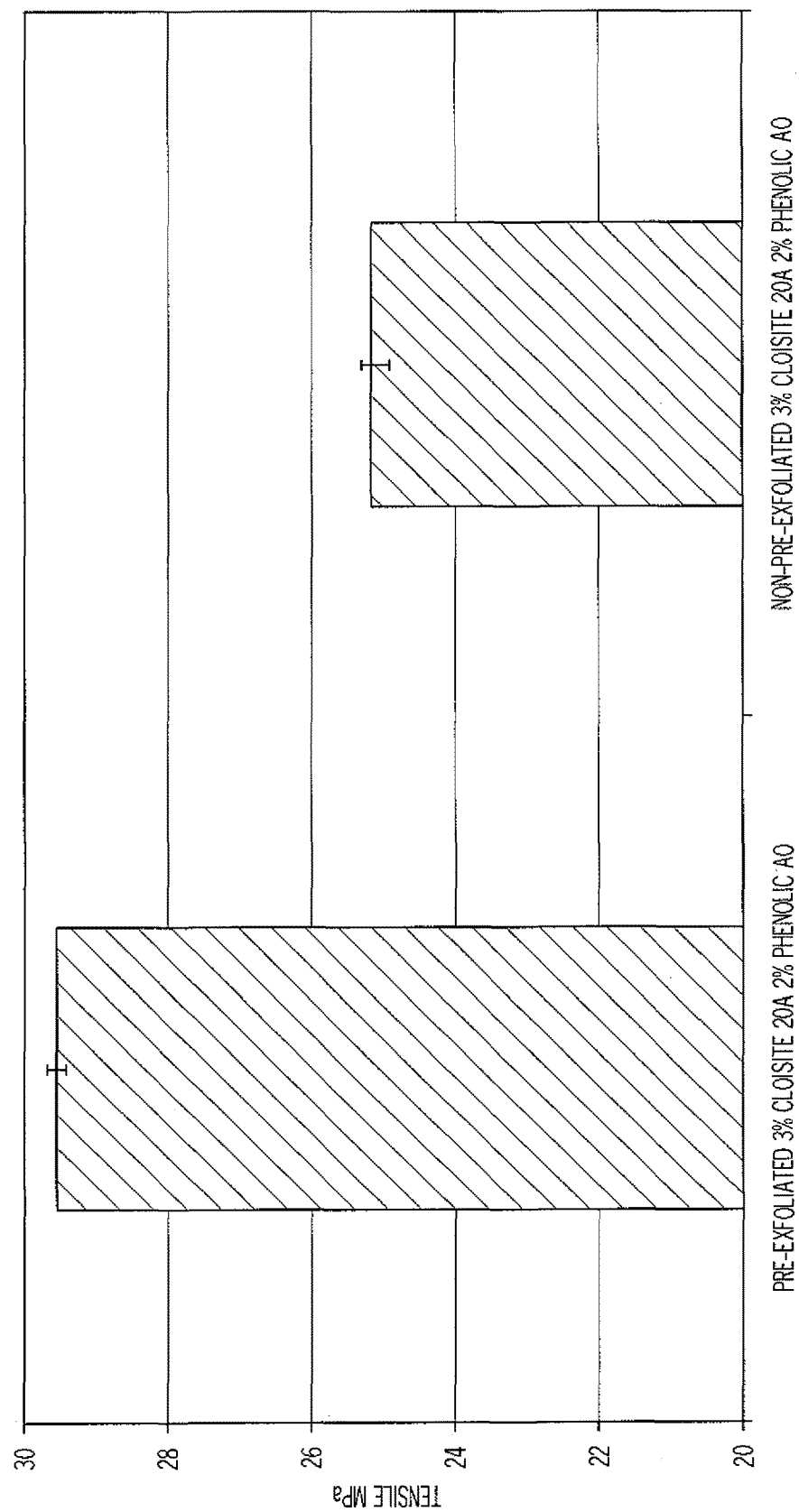
FIG. 10 shows the tensile strength of HDPE tensile bars containing CLOISITE 20A pre-exfoliated with IRGANOX 1010 and HDPE tensile bars containing identical amounts of CLOISITE 20A and IRGANOX 101 where the CLOISITE 20A is not pre-exfoliated. Experimental details are described in Example 2.

50 g of the pre-exfoliated sample of formulation 5 are added to 950 g of high density polyethylene (HDPE) and bag blended. This pre-mix is loaded directly into a lab scale Cincinnati Milacron Injection Molder without compounding and samples are injected for tensile testing. Tensile bars are 0.5 inches wide and 0.125 inches thick. The heating zones are zone 1=160° C., zone 2=200° C., zone 3=200° C. and nozzle=200° C. The loading in the polymer is 3% by weight CLOISITE 20A and 2% by weight IRGANOX 1010. A control sample is prepared that is identical except the clay is not pre-exfoliated with the additive. The tensile measurements obtained from an exemplary experiment are shown in FIG. 10.

I claim:

1. A pre-exfoliated layered material/additive composition consisting of (a) a pre-exfoliated natural or synthetic, modified or unmodified layered material, wherein a gallery of said layered material is between 3 nm and 20 nm; (b) a plastics additive which is a phosphite antioxidant; and (c) less than 20% by weight other components, based on the weight of said pre-exfoliated layered material/additive composition; and wherein the weight:weight ratio of said pre-exfoliated natural or synthetic, modified or unmodified layered material to said plastics additive is from about 10:90 to about 90:10.

2. The pre-exfoliated layered material/additive composition of claim 1, wherein said pre-exfoliated natural or synthetic, modified or unmodified layered material is selected from the group consisting of montmorillonite, bentonite, beidellite, mica, hectorite, saponite, nontronite, sauconite, vermiculite, ledikite, magatite, kenyaite, stevensite, volkonskoite, hydrotalcite, illite, kaolinite, wollastonite, attapulgite, sepiolite, halloysite, talcum, silica and mixtures thereof.

3. The pre-exfoliated layered material/additive composition of claim 1, wherein the weight:weight ratio of said pre-exfoliated natural or synthetic, modified or unmodified layered material to said plastics additive is from about 20:80 to about 80:20.

4. A pre-exfoliated layered material/additive composition consisting of (a) a pre-exfoliated natural or synthetic, modified or unmodified layered material; (b) a plastics additive which is a phosphite antioxidant; and (c) less than 20% by weight other components, based on the weight of said pre-exfoliated layered material/additive composition; and wherein the weight:weight ratio of said pre-exfoliated natural or synthetic, modified or unmodified layered material to said plastics additive is from about 10:90 to about 90:10.

5. The pre-exfoliated layered material/additive composition of claim 4, wherein said pre-exfoliated natural or synthetic, modified or unmodified layered material is selected from the group consisting of montmorillonite, bentonite, beidellite, mica, hectorite, saponite, nontronite, sauconite, vermiculite, ledikite, magatite, kenyaite, stevensite, volkonskoite, hydrotalcite, illite, kaolinite, wollastonite, attapulgite, sepiolite, halloysite, talcum, silica and mixtures thereof.

6. The pre-exfoliated layered material/additive composition of claim 4, wherein the weight:weight ratio of said pre-exfoliated natural or synthetic, modified or unmodified layered material to said plastics additive is from about 20:80 to about 80:20.

\* \* \* \* \*